(12) United States Patent
Frenne et al.

(10) Patent No.: US 12,207,256 B2
(45) Date of Patent: Jan. 21, 2025

(54) REPETITION FOR ULTRA-RELIABLE LOW-LATENCY COMMUNICATIONS

(71) Applicant: Telefonaktiebolaget LM Ericsson (publ), Stockholm (SE)

(72) Inventors: Mattias Frenne, Uppsala (SE); Yufei Blankenship, Kildeer, IL (US); Sebastian Faxér, Stockholm (SE); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 679 days.

(21) Appl. No.: 17/420,573

(22) PCT Filed: Jan. 3, 2020

(86) PCT No.: PCT/IB2020/050033
§ 371 (c)(1),
(2) Date: Sep. 17, 2021

(87) PCT Pub. No.: WO2020/141484
PCT Pub. Date: Jul. 9, 2020

(65) Prior Publication Data
US 2022/0124768 A1    Apr. 21, 2022

Related U.S. Application Data

(60) Provisional application No. 62/791,279, filed on Jan. 11, 2019, provisional application No. 62/788,348, filed on Jan. 4, 2019.

(51) Int. Cl.
*H04W 72/12* (2023.01)
*H04L 1/18* (2023.01)
(Continued)

(52) U.S. Cl.
CPC .......... *H04W 72/20* (2023.01); *H04L 1/1819* (2013.01); *H04L 5/0048* (2013.01)

(58) Field of Classification Search
CPC ..... H04W 72/20; H04L 1/1819; H04L 5/0048
(Continued)

(56) References Cited

U.S. PATENT DOCUMENTS 9,497,773 B2   11/2016   Zhang et al.
11,664,853 B2   5/2023   Park et al.
(Continued)

FOREIGN PATENT DOCUMENTS

CN    106489246 A    3/2017
CN    108282870 A    7/2018
(Continued)

OTHER PUBLICATIONS

"3GPP TS 38.214 V15.3.0", 3rd Generation Partnership Project; Technical Specification Group Radio Access Network; NR; Physical layer procedures for data (Release 15), Sep. 2018, pp. 1-96.
(Continued)

*Primary Examiner* — Faisal Choudhury
(74) *Attorney, Agent, or Firm* — Murphy, Bilak & Homiller, PLLC

(57) ABSTRACT

Embodiments include methods, performed by a user equipment (UE), for communicating via a plurality of nodes in a wireless network. Such methods include receiving a plurality of Transmission Configuration Indicator (TCI) states, and receiving, via a single physical control channel, scheduling information for a plurality of physical data channels carrying a respective plurality of repetitions of a data block. The physical data channels can be respective layers of a PDSCH, or each physical data channel can be a subset of all layers of a PDSCH. Such methods include assigning one or more of the TCI states to the plurality of repetitions, and receiving
(Continued)

the plurality of repetitions via the plurality of physical data channels based on the scheduling information and the assigned TCI states. Embodiments also include complementary methods performed by a wireless network, as well as UEs and wireless networks configured to perform such methods.

25 Claims, 14 Drawing Sheets

(51) Int. Cl.
*H04L 1/1812* (2023.01)
*H04L 5/00* (2006.01)
*H04W 72/20* (2023.01)

(58) Field of Classification Search
USPC .......................................................... 370/329
See application file for complete search history.

(56) References Cited

U.S. PATENT DOCUMENTS

| | | | |
|---|---|---|---|
| 11,979,865 | B2 | 5/2024 | Muruganathan et al. |
| 2017/0094642 | A1 | 3/2017 | Lee et al. |
| 2017/0223725 | A1 | 8/2017 | Xiong et al. |
| 2017/0366311 | A1 | 12/2017 | Iyer et al. |
| 2018/0206132 | A1 | 7/2018 | Guo et al. |
| 2018/0270799 | A1 | 9/2018 | Noh et al. |
| 2019/0334680 | A1 | 10/2019 | Li et al. |
| 2020/0045700 | A1* | 2/2020 | Sun .................. H04L 5/0091 |
| 2020/0106559 | A1* | 4/2020 | Vilaipornsawai ..... H04L 1/1896 |
| 2020/0228970 | A1 | 7/2020 | Noh et al. |
| 2021/0160030 | A1 | 5/2021 | Myung et al. |
| 2021/0250981 | A1* | 8/2021 | Takeda .............. H04W 72/1273 |
| 2022/0095350 | A1* | 3/2022 | Lee ...................... H04L 1/0061 |

FOREIGN PATENT DOCUMENTS

| | | | |
|---|---|---|---|
| CO | 6781466 | A2 | 10/2013 |
| KR | 101886451 | B1 | 8/2018 |
| WO | 2008020738 | A1 | 2/2008 |
| WO | 2012088284 | A2 | 6/2012 |
| WO | 2015018361 | A1 | 2/2015 |
| WO | 2018156696 | A1 | 8/2018 |
| WO | 2018203626 | A1 | 11/2018 |

OTHER PUBLICATIONS

"Discussion on the PDCCH repetition for NR URLLC", 3GPP TSG RAN WG1 Meeting #94bis, R1-1811401, Chengdu, China, Oct. 8-12, 2018, pp. 1-5.
"3GPP TS 38.401 V15.6.0", 3rd Generation Partnership Project; Technical Specification Group Radio Access Network; NG-RAN; Architecture description (Release 15), Jul. 2019, pp. 1-46.
"Additional evaluation results for NC-JT under 5G UMa scenario", 3GPP TSG RAN WG1 Meeting Ad-Hoc Meeting 1901, R1-1900731, Taipei, Taiwan, Jan. 21-25, 2019, pp. 1-2.
"Enhancement to PDSCH RE mapping and resource allocation for non-coherent JT", 3GPP TSG RAN WG1 Meeting #89; R1-1707009; Hangzhou, China, May 15-19, 2017, pp. 1-5.
"Enhancements on multi-TAP/panel transmission", 3GPP TSG RAN WG1 Meeting #95; R1-1813333; Spokane, USA, Nov. 12-16, 2018, pp. 1-20.
"Enhancements on multi-TRP/Panel transmission", 3GPP TSG RAN WG1 Meeting #95; R1-1812256; Spokane, USA, Nov. 12-16, 2018, pp. 1-14.
"Enhancements on Multi-TRP/Panel Transmission", 3GPP TSG RAN WG1 Meeting #95; R1-1813489; Spokane, USA, Nov. 12-16, 2018, pp. 1-18.
"Enhancements on multi-TRP/panel transmission", 3GPPTSG RAN WGl Meeting #95; R1-1812243; Spokane, USA, Nov. 12-16, 2018, pp. 1-9.
"Enhancements to control signaling", 3GPP TSG RAN WG1 NR #88bis; R1-1704424; Spokane, USA, Apr. 3-7, 2017, pp. 1-3.
"Enhancements to control signaling related to PDSCH RE mapping and resource allocation", 3GPP TSG RAN WG1 Meeting #89; R1-1707143; Hangzhou, P.R. China, May 15-19, 2017, pp. 1-5.
"On the number of TRPs for high reliability at 4 GHz", 3GPP TSG RAN WG1 Ad-Hoc Meeting 1901, Tdoc R1-1901116. Taipei, Taiwan, Jan. 21-25, 2019, pp. 1-5.
"Summary of AI: 7.2.8.2 Enhancements on Multi-TRP/Panel Transmission", 3GPP TSG RAN WG1 Meeting #94bis; R1-1811882; Chengdu, China, Oct. 8-12, 2018, pp. 1-22.
"3GPP TS 36.213 V15.2.0", 3rd Generation Partnership Project; Technical Specification Group Radio Access Network; Evolved Universal Terrestrial Radio Access (E-UTRA); Physical layer procedures (Release 15), Jun. 2018, pp. 1-541.
"3rd Generation Partnership Project; Technical Specification Group Radio Access Network; NR; Multiplexing and channel coding (Release 15)", 3GPP TS 38.212 V15.3.0, Sep. 2018, pp. 1-99.
"3GPP TS 38.211 V15.2.0", 3rd Generation Partnership Project; Technical Specification Group Radio Access Network; NR; Physical channels and modulation (Release 15), Jun. 2018, pp. 1-96.
"3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.
"3GPP TS 38.321 V15.2.0", 3rd Generation Partnership Project; Technical Specification Group Radio Access Network; NR; Medium Access Control (MAC) protocol specification (Release 15), Jun. 2018, pp. 1-73.
"On multi-TRP and multi-panel", 3GPP TSG RAN WG1 Meeting RAN1#96-bis, R1-1904750, Xi'an, China, Apr. 8-12, 2019, pp. 1-18.

* cited by examiner

REPETITION FOR ULTRA-RELIABLE LOW-LATENCY COMMUNICATIONS

TECHNICAL FIELD

Embodiments of the present disclosure relate generally to wireless communication networks, and more specifically to performance improvements in ultra-reliable low-latency communications (URLLC) in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP. E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots $2i$ and $2i+1$. Each exemplary FDD DL slot consists of $N_{symb}^{DL}$ OFDM symbols, each of which is comprised of $N_{sc}$ OFDM subcarriers. Exemplary values of $N_{symb}^{DL}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N_{sc}^{RB}$ sub-carriers over the duration of a slot (i.e., $N_{symb}^{DL}$ symbols), where $N_{sc}^{RB}$ is typically either 12 (with a 15-kHz sub-carrier bandwidth) or 24 (7.5-kHz bandwidth). A PRB spanning the same $N_{sc}^{RB}$ subcarriers during an entire subframe (i.e., $2N_{symb}^{DL}$ symbols) is known as a PRB pair. Accordingly, the resources available in a subframe of the LTE PHY DL comprise $N_{RB}^{DL}$ PRB pairs, each of which comprises $2N_{symb}^{DL} \cdot N_{sc}^{RB}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N_{symb}^{UL}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

FIG. 4 illustrates one exemplary manner in which the CCEs and REGs can be mapped to a physical resource, e.g., PRBs. As shown in FIG. 4, the REGs comprising the CCEs of the PDCCH can be mapped into the first three symbols of a subframe, whereas the remaining symbols are available for other physical channels, such as the PDSCH which carries user data. In the exemplary arrangement of FIG. 4, each of the REGs comprises four REs, which are represented by the small, dashed-line rectangles. Although two CCEs are shown in FIG. 4, the number of CCEs may vary depending on the required PDCCH capacity, which can be based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1,2,3 or 4) is known as the Control Format Indicator (CFI) indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. NR also shares various other features of LTE that were discussed above.

For NR Rel-16, it has been discussed to support multi-source transmission of PDSCH to UEs. In this context, "source" can refer to a beam, a panel, a transmission/reception point (TRP), etc. For example, to support URLLC, it can be beneficial to transmit multiple versions of a transport block (TB) of data to a UE from different TRPs. This requires scheduling multiple PDSCH to the same UE, which requires the UE to correctly decode multiple PDCCH with scheduling information for the respective PDSCH. The multiple PDCCH for a single UE can increase UE complexity and also consumes more control channel resources, which reduces the flexibility for scheduling other UEs in the same slot and/or increases PDCCH blocking probability. These effects are undesirable.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods (e.g., procedures) for communicating via a plurality of nodes in a wireless network. These exemplary methods can be performed by a user equipment (UE, e.g., wireless device, IoT device, modem, etc. or component thereof) in communication with one or more network nodes (e.g., base station, gNB, en-gNB, etc., or component thereof) in a wireless network (e.g., E-UTRAN, NG-RAN).

These exemplary methods can include receiving, from the wireless network, a plurality of Transmission Configuration Indicator (TCI) states. In some embodiments, the plurality of TCI states can be associated with one of the following: a respective plurality of nodes in the wireless network; or a respective plurality of beams associated with one or more nodes in the wireless network.

These exemplary methods can also include receiving, via a single physical control channel, scheduling information for a plurality of physical data channels carrying a respective plurality of repetitions of a data block. For example, the physical control channel can be a PDCCH and the scheduling information can be a scheduling DCI, such as discussed above. In some embodiments, the plurality of physical data channels can be respective layers of a physical downlink shared channel (PDSCH). In other embodiments, each physical data channel can be a subset of all layers of a PDSCH.

In some embodiments, the scheduling information can also include an indicator of resources for receiving one or more of the repetitions. The indicated resources can be in at least one of the following dimensions: time, frequency, and spatial layer. In some embodiments, the resources for at least two of the repetitions can be in the same set of symbols in a slot.

In other embodiments, the scheduling information can include an indicator of first resources for receiving a first one of the repetitions. In such embodiments, these exemplary methods can also include receiving one or more offsets to be applied to the first resources to determine further resources for receiving the remaining ones of the repetitions. In such embodiments, the further resources can be located in one of the following with respect to the first resources: one or more subsequent slots, or one or more subsequent symbols within the same slot.

In some embodiments, the indicated resources for at least two of the repetitions can overlap completely in frequency. In such embodiments, the scheduling information also includes at least one of the following for each of the completely overlapping repetitions: a unique set of demodulation reference signal (DMRS) ports; DMRS ports from a unique code-division multiplexing (CDM) group; and a unique data scrambling seed.

In some embodiments, the scheduling information can also include an indicator of a mapping between the plurality of repetitions and a plurality of redundancy versions (RV) of the data block.

These exemplary methods can also include assigning one or more of the TCI states to the plurality of repetitions. In some embodiments, the plurality of TCI states is less than the plurality of repetitions, and the plurality of TCI states are assigned to the repetitions in a predefined order. In other embodiments, the scheduling information can also include an indicator of a mapping between one or more of the TCI states and the plurality of repetitions. In such embodiments, the one or more TCI states are assigned to the repetitions based on the indicated mapping. In some of these embodiments, the indicator is included in a field having a plurality of codepoints, the plurality of TCI states being less than the plurality of codepoints. In such embodiments, a first subset of the codepoints can be associated with individual TCI states and a second subset of the codepoints can be associated with combinations of individual TCI states.

In some embodiments, each TCI state includes one or more source reference signal (RS) pairs, with each source RS pair having a corresponding pair of quasi-colocation (QCL) relations with antenna ports, for DM-RS, that are mapped to a particular physical data channel. In such embodiments, these exemplary methods can also include, for each of the plurality of TCI states, determining channel parameters based on the source RS pairs included in the particular TCI state.

These exemplary methods can also include receiving the plurality of repetitions via the plurality of physical data channels based on the scheduling information and the assigned TCI states. In some embodiments, these operations can include the following for each of the physical data channels: based on the channel parameters (e.g., determined for the source RS pairs), receiving the DM-RS mapped to the physical data channel; determining further channel parameters based on the received DM-RS; and receiving the physical data channel based on the further channel parameters.

Other exemplary embodiments include methods (e.g., procedures) for communicating via a plurality of physical data channels with a single user equipment (UE). These exemplary methods can be performed by one or more network nodes (e.g., base stations, eNBs, gNBs, en-gNBs, etc., or components thereof) of a wireless network (e.g., NG-RAN, E-UTRAN).

These exemplary methods can include transmitting, to the UE, a plurality of Transmission Configuration Indicator (TCI) states. In some embodiments, the plurality of TCI states can be associated with one of the following: a respective plurality of nodes in the wireless network; or a respective plurality of beams associated with one or more nodes in the wireless network.

These exemplary methods can also include assigning one or more of the TCI states to a plurality of repetitions, of a data block, to be carried by a respective plurality of physical data channels. In some embodiments, the plurality of TCI states can be less than the plurality of repetitions, and the plurality of TCI states can be assigned to the repetitions in a predefined order. The UE can also be aware of this predefined order, and assign TCI states to repetitions in a corresponding manner.

These exemplary methods can also include transmitting, via a single physical control channel, scheduling information for a plurality of physical data channels carrying a respective plurality of repetitions of a data block. In some embodiments, the plurality of physical data channels can be respective layers of a physical downlink shared channel (PDSCH). In other embodiments, each physical data channel can be a subset of all layers of a PDSCH.

In some embodiments, the scheduling information can also include an indicator of resources for receiving one or more of the repetitions. The indicated resources can be in at least one of the following dimensions: time, frequency, and spatial layer. In some embodiments, the resources for at least two of the repetitions can be in the same set of symbols in a slot.

In other embodiments, the scheduling information can include an indicator of first resources for receiving a first one of the repetitions. In such embodiments, these exemplary methods can also include transmitting one or more offsets to be applied to the first resources to determine further resources for receiving the remaining ones of the repetitions. In such embodiments, the further resources can be located in one of the following with respect to the first resources: one or more subsequent slots, or one or more subsequent symbols within the same slot.

In some embodiments, the indicated resources for at least two of the repetitions can overlap completely in frequency. In such embodiments, the scheduling information can also include at least one of the following for each of the completely overlapping repetitions: a unique set of demodulation reference signal (DMRS) ports; DMRS ports from a unique code-division multiplexing (CDM) group; and a unique data scrambling seed.

In some embodiments, the scheduling information can also include an indicator of a mapping between the plurality of repetitions and a plurality of redundancy versions (RV) of the data block.

In some embodiments, the scheduling information can also include an indicator of a mapping between one or more of the TCI states and the plurality of repetitions. For example, this mapping can reflect and/or indicate the assignment of TCI states to repetitions. In some of these embodiments, the indicator is included in a field having a plurality of codepoints, the plurality of TCI states being less than the plurality of codepoints. In such embodiments, a first subset of the codepoints can be associated with individual TCI states and a second subset of the codepoints can be associated with combinations of individual TCI states.

In some embodiments, each TCI state can include one or more source reference signal (RS) pairs, with each source RS pair having a corresponding pair of quasi-colocation (QCL) relations with antenna ports, for DM-RS, that are mapped to a particular physical data channel. In such embodiments, these exemplary methods can also include, for each of the plurality of TCI states, transmitting the source RS pair included in the particular TCI state.

These exemplary methods can also include transmitting the plurality of repetitions via the plurality of physical data channels based on the scheduling information and the assigned TCI states. In some embodiments, these operations can include transmitting the respective DM-RS in association with the physical data channels to which they are mapped. This can facilitate the UE to utilize the source RS pairs and the QCL relations to receive a target RS (e.g., DM-RS) that is associated with a particular physical data channel.

Other exemplary embodiments include wireless networks including one or more network nodes (e.g., base stations, eNBs, gNBs, CU/DU, TRPs, controllers, etc.) and user equipment (UEs e.g., wireless devices, IoT devices, or components thereof, such as a modem) configured to perform operations corresponding to any of the exemplary methods described herein. Other exemplary embodiments include non-transitory, computer-readable media storing program instructions that, when executed by processing circuitry, configure such wireless networks or UEs to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 8, which includes

DETAILED DESCRIPTION

Figure 1:
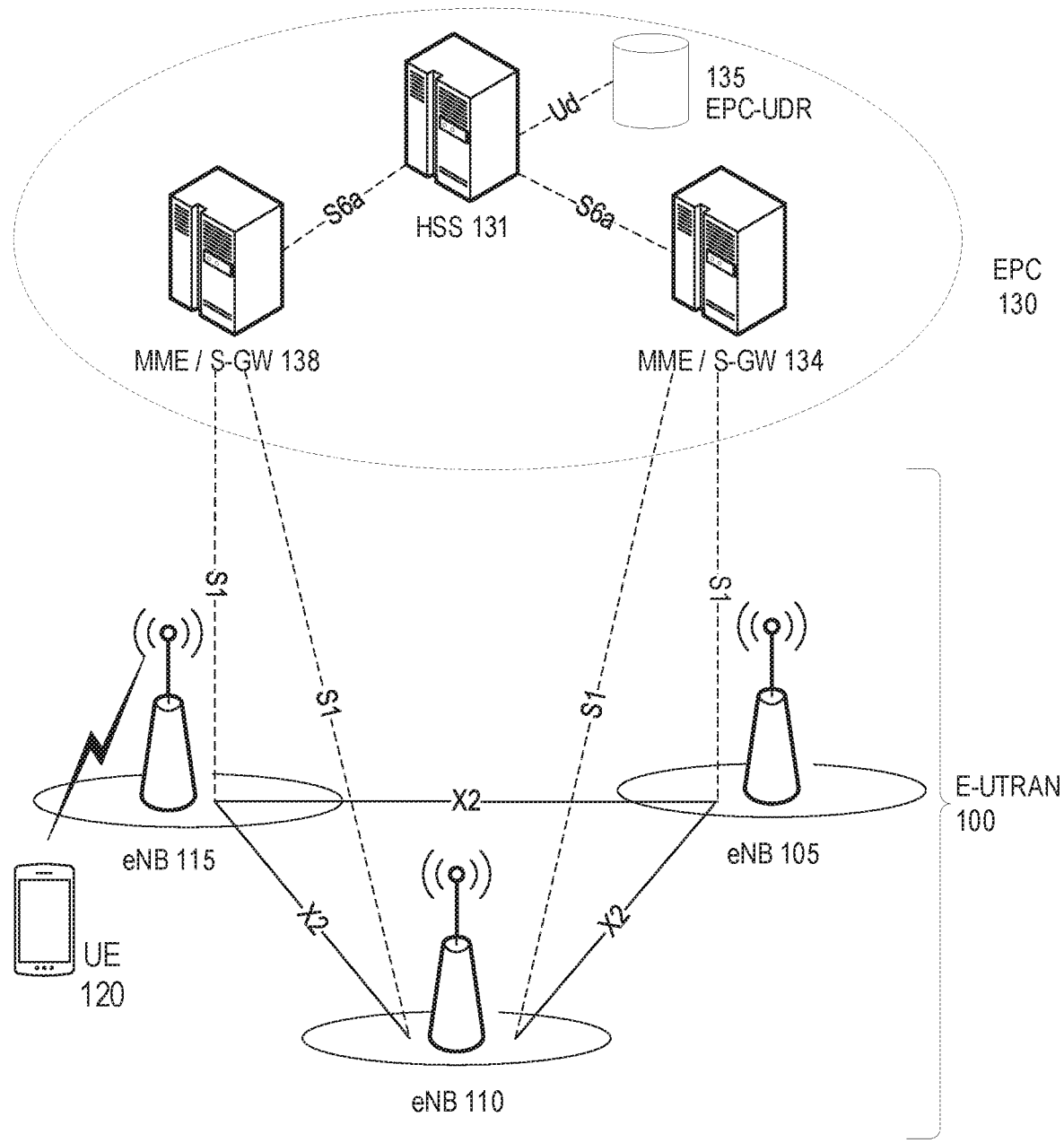
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
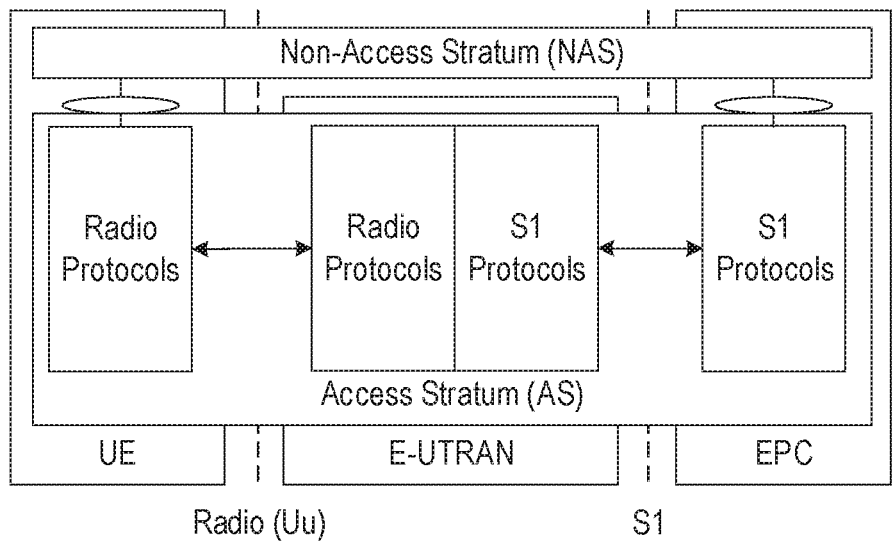
FIG. 2A is a high-level block diagram of an exemplary E-UTRAN architecture in terms of its constituent components, protocols, and interfaces.
Figure 2B:
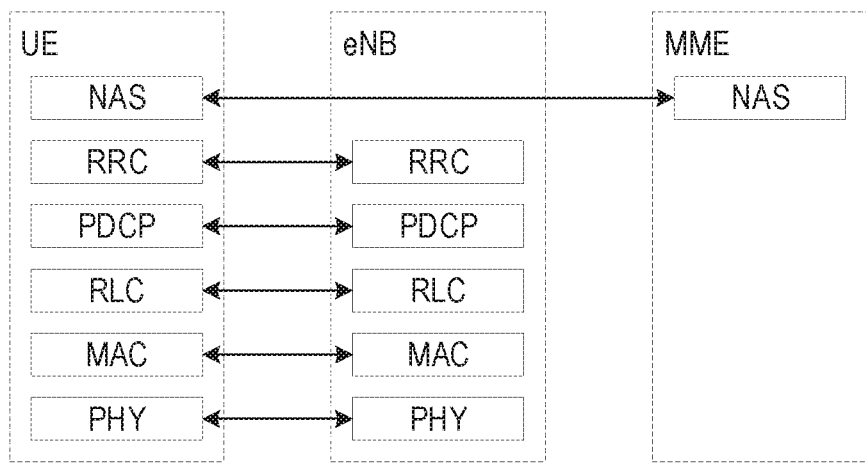
FIG. 2B is a block diagram of exemplary protocol layers of the control-plane portion of the radio (Uu) interface between a user equipment (UE) and the E-UTRAN.
Figure 2C:
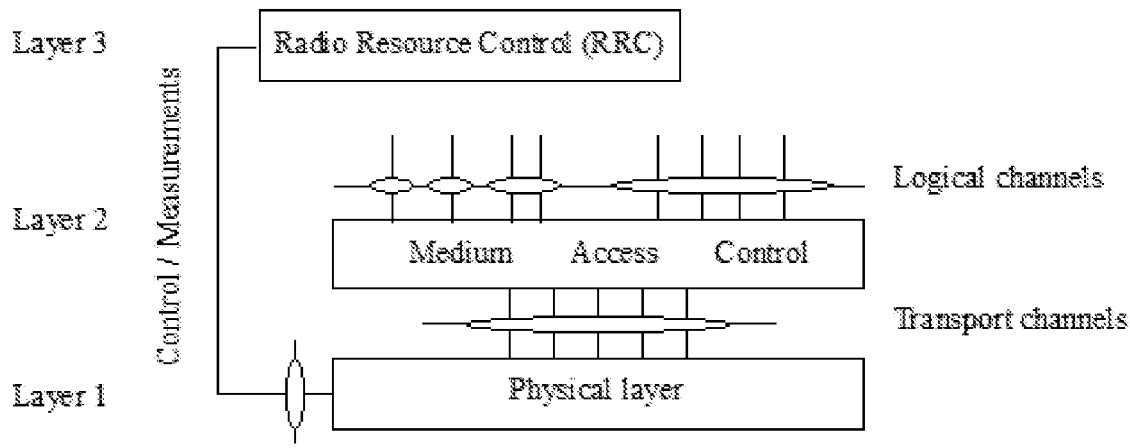
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, various terms discussed below will be used throughout the application.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The term "radio network node" can refer to any type of network node that can comprise any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH), integrated access backhaul (IAB) node, etc.

In some embodiments, a TRP may be associated with a network node or radio network node. In some embodiments, a multi-TRP scenario may include more than one TRPs associated with one or more network nodes.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IoT) device, aerial device (e.g., drone), ProSe UE, V2V UE, V2X UE, etc.

Unless otherwise noted, functions described herein as being performed by a network node or a UE can be distributed over a plurality of network nodes or UEs. In other words, it is contemplated that the functions of the network node and UE described herein are not limited to performance by a single physical device and, in fact, can be distributed among several physical devices.

Unless otherwise noted, the term "time resource" can correspond to any type of physical resource or radio resource expressed in terms of length of time or time interval or time duration. In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

Unless otherwise noted, the term "TTI" can correspond to any time period over which a physical channel can be encoded and interleaved for transmission (e.g., during the TTI). The physical channel can be decoded by the receiver over the same time period (TO) over which it was encoded. The TTI may also interchangeably called as short TTI (sTTI), transmission time, slot, sub-slot, mini-slot, short subframe (SSF), mini-subframe etc.

In some embodiments, a transmitter (e.g., network node) and a receiver (e.g., WD) can have a common, predetermined understanding about rule(s) for determining which resources to be arranged for transmission and/or reception of one or more physical channels. Such rules may, in some embodiments, be referred to as "mapping." In other embodiments, the term "mapping" may have other meanings.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, e.g., if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Although embodiments may be described below in the context of a downlink (DL) channel (e.g., PDSCH), it should be understood that the principles underlying such embodiments may also be applicable to other channels, e.g., other DL channels and/or certain uplink channels (e.g., PUSCH).

Although the term "cell" is used herein, it should be understood that (particularly with respect to 5G/NR) beams may be used instead of cells and, as such, concepts described herein apply equally to both cells and beams.

Although terminology from one or more specific wireless systems (e.g., LTE and/or NR) may be used herein, this should not be seen as limiting the scope of the disclosure to only those specific wireless system(s). Other wireless systems, including Wide Band Code Division Multiple Access (WCDMA), Worldwide Interoperability for Microwave Access (WiMax), Ultra Mobile Broadband (UMB), and Global System for Mobile Communications (GSM), may also benefit from principles and/or embodiments of the present disclosure.

As briefly mentioned above, it has been discussed to support multi-source transmission of PDSCH to UEs for NR Rel-16. In this context, the term "source" can refer to a beam, a panel, a transmission/reception point (TRP), etc. For example, to support URLLC, it can be beneficial to transmit multiple versions of a transport block (TB) to a UE from different TRPs, also referred to as "multi-TRP diversity." This requires scheduling multiple PDSCH to the same UE. However, this increases UE complexity since the UE needs to correctly decode multiple PDCCH in order to receive multiple PDSCH to benefit from the multi-TRP diversity of the transmission. The multiple PDCCH for a single UE also reduces the flexibility for scheduling other UEs in the same slot, and/or increases PDCCH blocking probability. These issues are discussed in more detail below.

In Rel-15 NR, a UE can be configured with up to four carrier bandwidth parts (BWPs) in the downlink (DL) with a single DL carrier BWP being active at a given time. A UE can also be configured with up to four uplink (UL) carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

Figure 5:
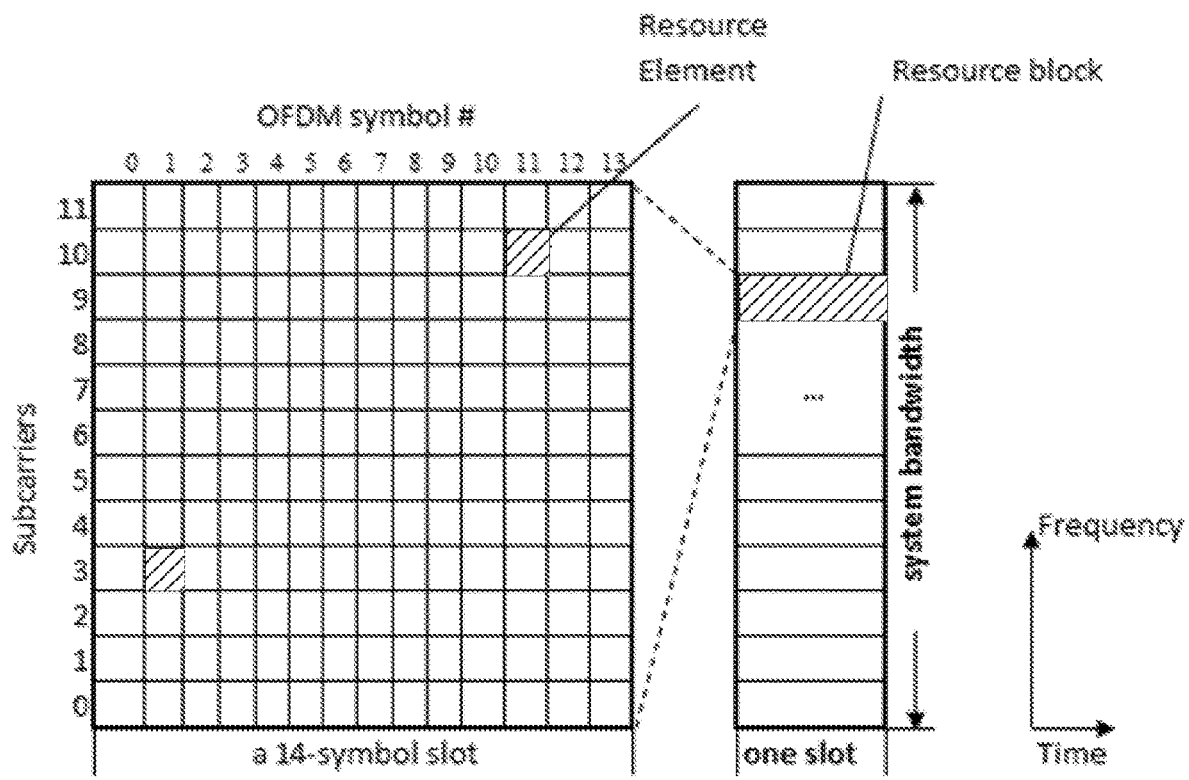
FIG. 5 shows an exemplary time-frequency resource grid for an NR slot.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWH}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 24^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The slot length is inversely related to SCS or numerology according to $\frac{1}{2}^\mu$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu *180$ KHz.

Table 1 below summarizes the supported NR numerologies and associated parameters. Different DL and UL numerologies can be configured by the network.

TABLE 1

| $\mu$ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 µs | 1.44 |
| 4 | 240 | Normal | 62.5 µs | 2.88 |

Figure 6A:
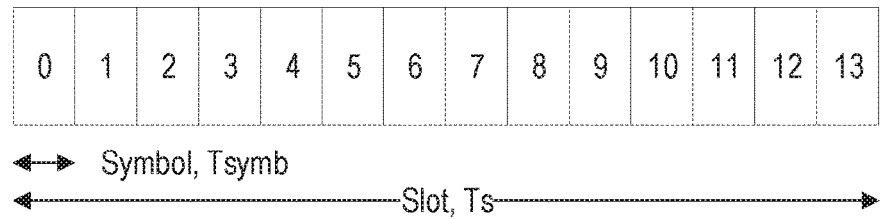
FIGS. 6A-6B shows various exemplary NR slot configurations.

An NR slot can include 14 OFDM symbols for normal cyclic prefix and 12 symbols for extended cyclic prefix. FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6B:
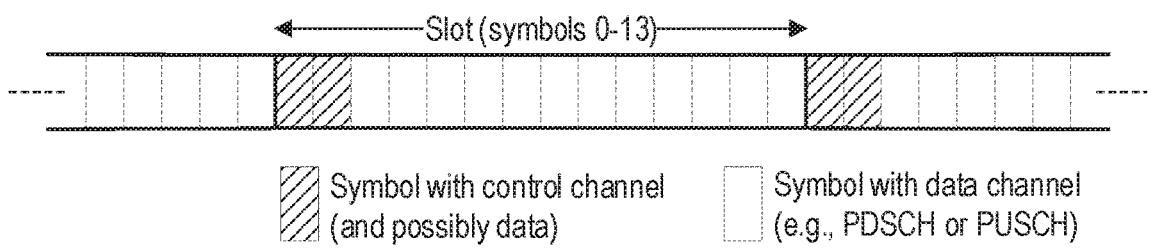

FIG. 6B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

Figure 4:
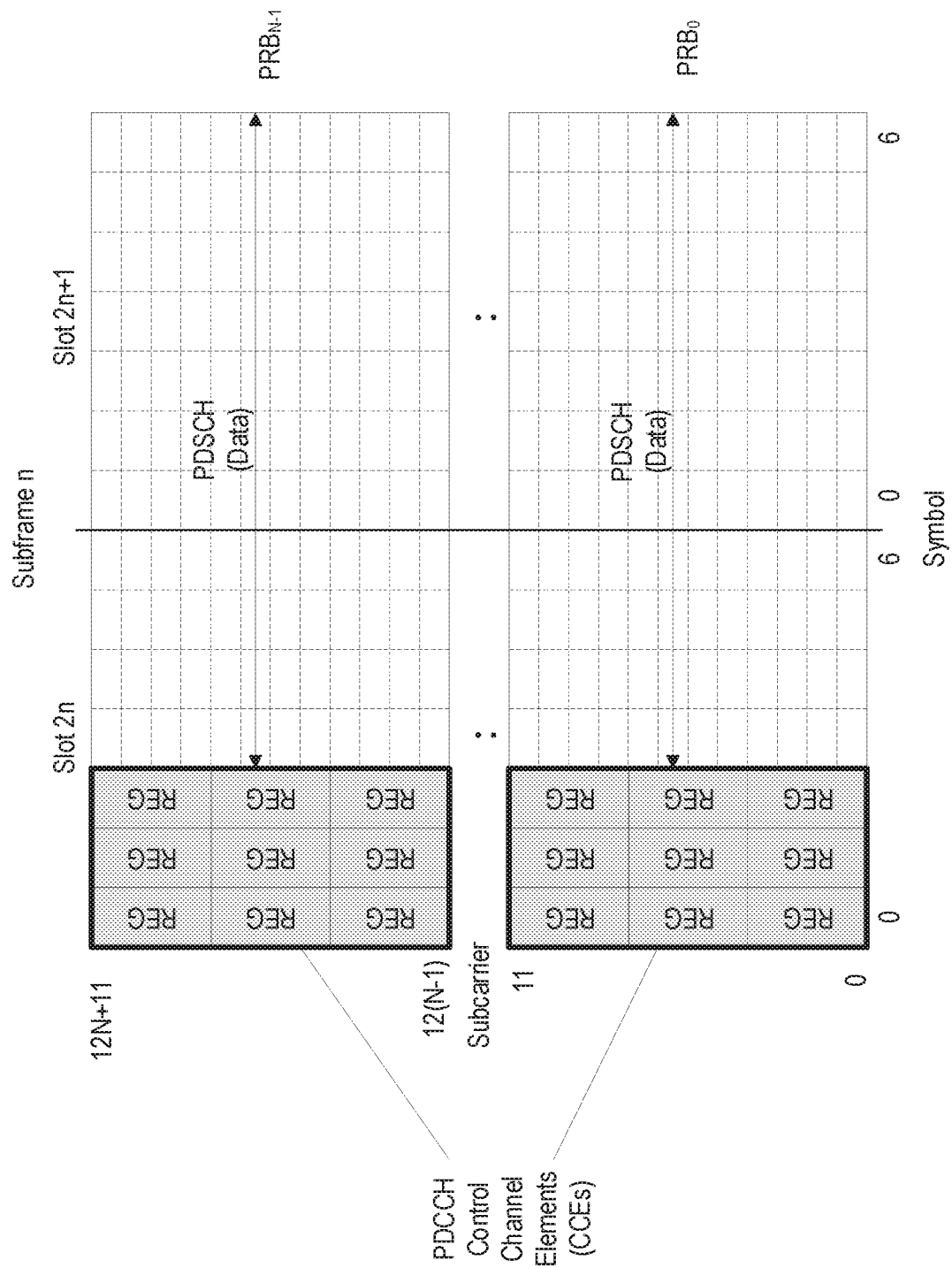
FIG. 4 shows an exemplary manner in which the CCEs and REGs can be mapped to a physical resource.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 6 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be done dynamically on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is (are) assigned to it and/or associated with the particular PDCCH search space. In case of a match, the UE considers the detected DCI as being addressed to it, and follows the instructions (e.g., scheduling information) in the DCI.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

Finally, DCI format 0_1 can also include a network request for a UE report of channel state information (CSI) or channel quality information (CQI). Prior to sending this report, the UE receives and measures CSI-RS transmitted by the network. The parameter aperiodicTriggeringOffset represents the integer number of slots between the UE's reception of a DCI including a CSI request and the network's transmission of the CSI-RS. This parameter can take on values 0-4.

In addition to dynamic scheduling on a per-slot basis, discussed above, NR also supports semi-persistent scheduling in the DL. In this approach, the network configures a periodicity of PDSCH transmission via RRC and then controls the start and stop of transmissions via DCI in PDCCH. One advantage of this technique is reduction of control signaling overhead on PDCCH.

NR also supports a similar feature on the UL, referred to as configured grants (CG). In general, CG type 2 is similar to DL semi-persistent scheduling in downlink (e.g., RRC plus DCI) while CG type 1 is controlled by only RRC, including the start and stop of transmissions.

Figure 7:
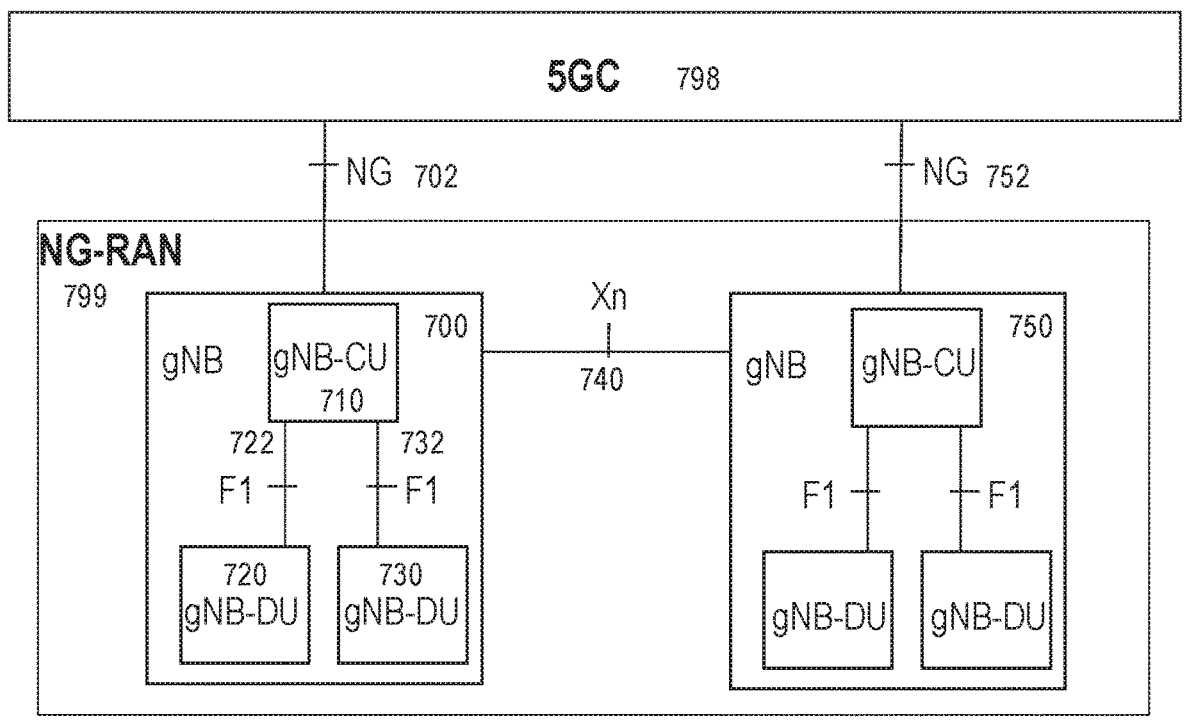
FIG. 7 illustrates a high-level view of a 5G network architecture.

FIG. 7 illustrates a high-level view of the 5G network architecture, consisting of a Next Generation RAN (NG-RAN) 799 and a 5G Core (5GC) 798. NG-RAN 799 can include a set of gNodeB's (gNBs) connected to the 5GC via one or more NG interfaces, such as gNBs 700, 750 connected via interfaces 702, 752, respectively. In addition, the gNBs can be connected to each other via one or more Xn interfaces, such as Xn interface 740 between gNBs 700 and 750. With respect to the NR interface to UEs, each of the gNBs can support frequency division duplexing (FDD), time division duplexing (TDD), or a combination thereof.

The NG RAN logical nodes shown in FIG. 7 (and described in TS 38.401 and TR 38.801) include a central (or centralized) unit (CU or gNB-CU) and one or more distributed (or decentralized) units (DU or gNB-DU). For example, gNB 700 in FIG. 7 includes gNB-CU 710 and gNB-DUs 720 and 730. CUs (e.g., gNB-CU 710) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 3A:
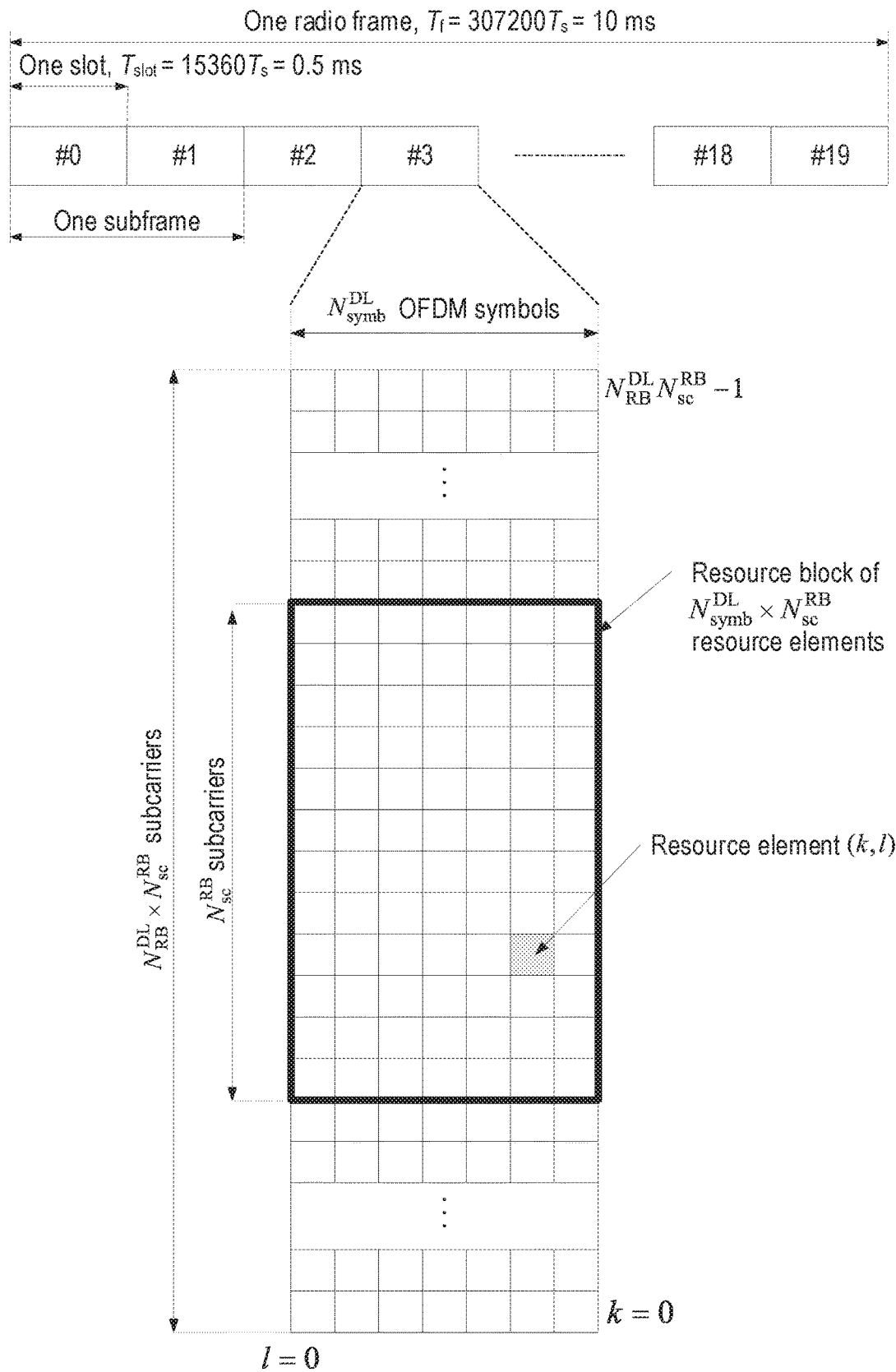
FIGS. 3A and 3B are block diagrams, respectively, of exemplary downlink and uplink LTE radio frame structures used for frequency division duplexing (FDD) operation.
Figure 3B:
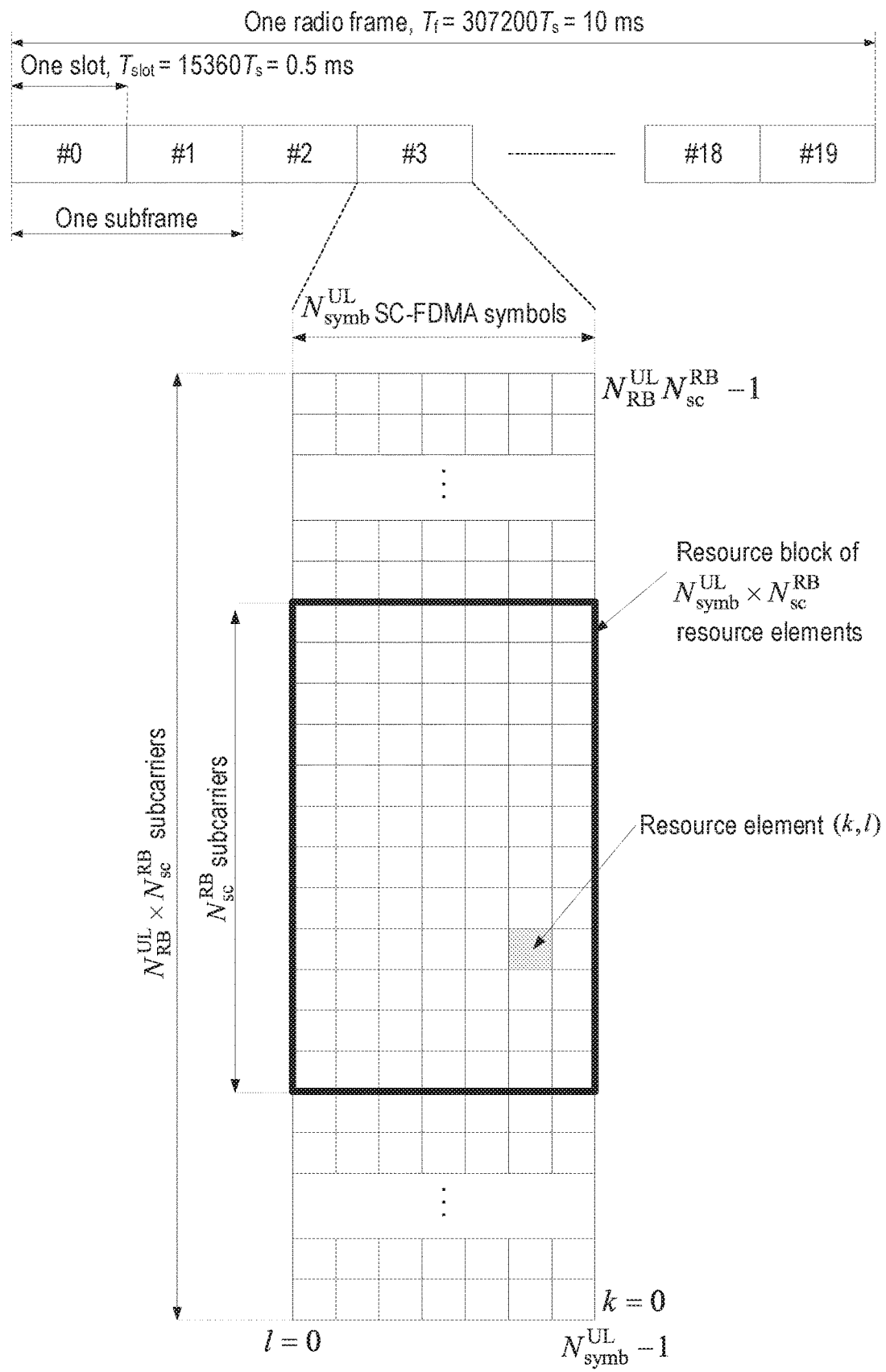

A gNB-CU connects to gNB-DUs over respective F1 logical interfaces, such as interfaces 722 and 732 shown in FIG. 3. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Several signals can be transmitted from the same base station (e.g., gNB) antenna from different antenna ports. These signals can have the same large-scale properties, for instance in terms of Doppler shift/spread, average delay spread, or average delay. These antenna ports are then said to be "quasi co-located" or "QCL," The network can signal to the UE that two antenna ports are QCL. Once the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (referred to as "source RS") and the second antenna port is a demodulation reference signal (DMRS) (referred to as "target RS").

For instance, if antenna ports A and B are QCL with respect to average delay, the UE can estimate the average delay from the signal received from antenna port A (source RS) and assume that the signal received from antenna port B (target RS) has the same average delay. This can be useful for demodulation since the UE can know beforehand the properties of the channel when trying to measure the channel utilizing the DMRS.

Information about what assumptions can be made regarding QCL is signaled to the UE from the network. In NR, the following four types of QCL relations between a transmitted source RS and transmitted target RS are defined:

Type A: {Doppler shift, Doppler spread, average delay, delay spread};
Type B: {Doppler shift, Doppler spread};
Type C: {average delay, Doppler shift}; and
Type D: {Spatial Rx parameter}.

QCL type D was introduced to facilitate beam management with analog beamforming and is known as "spatial QCL." There is currently no strict definition of spatial QCL, but the understanding is that if two transmitted antenna ports are spatially QCL, the UE can use the same Rx beam to receive them.

QCL Type D is the most relevant for beam management, but it is also necessary to convey a Type A QCL RS relation to UEs so they can estimate all the relevant large scale parameters. Typically this can be done by configuring a UE with a tracking reference signal (TRS, e.g., a CSI-RS) for time/frequency offset estimation. To be able to use any QCL reference, the UE would have to receive it with a sufficiently good signal-to-interference-plus-noise ratio (SINR). In many cases, this constrains the TRS for a particular UE to be transmitted in a particular beam and/or beam configuration.

To introduce dynamics in beam and TRP selection, the UE can be configured through RRC signaling with N Transmission Configuration Indicator (TCI) states, where N is up to 128 in frequency range 2 (FR2) and up to eight in FR1, depending on UE capability. Each configured TCI state contains parameters for the QCL associations between source RS (e.g., CSI-RS or SS/PBCH) and target RS (e.g., PDSCH/PDCCH DMRS ports). TCI states can also be used to convey QCL information for the reception of CSI-RS. Each of the N states in the list of TCI states can be interpreted as a list of N possible beams transmitted from the network, or a list of N possible TRPs used by the network to communicate with the UE.

More specifically, each TCI state can contain QCL information including one or two source DL RSs, with each source RS associated with a QCL type. For example, two different CSI-RSs {CSI-RS1, CSI-RS2} can be configured in the TCI state as {qcl-Type1, qcl-Type2}= {Type A, Type D}. The UE can interpret this TCI state to mean that the UE can derive Doppler shift, Doppler spread, average delay, delay spread from CSI-RSI, and Spatial Rx parameter (e.g., RX beam to use) from CSI-RS2. In case QCL Type D is not applicable (e.g., low- or mid-band operation), then a TCI state contains only a single source RS.

Furthermore, a first list of available TCI states can be configured for PDSCH, and a second list can be configured for PDCCH. This second list can contain pointers, known as TCI State IDs, to a subset of the TCI states configured for PDSCH. For the UE operating in FR1, the network then activates one TCI state for PDCCH (i.e., by providing a TCI to the UE) and up to eight TCI states for PDSCH, depending on UE capability.

As an example, a UE is configured with four active TCI states from a list of 64 total configured TCI states. Hence, the other 60 configured TCI states are inactive and the UE need not be prepared to estimate large scale parameters for those. On the other hand, the UE continuously tracks and updates the large scale parameters for the four active TCI states by performing measurements and analysis of the source RSs indicated for each of those four TCI states. Each DCI used for PDSCH scheduling includes a pointer to one active TCI for the scheduled UE. Based on this pointer, the UE knows which large scale parameter estimate to use when performing PDSCH DMRS channel estimation and PDSCH demodulation.

Demodulation reference signals (DM-RS) facilitate the UE's coherent demodulation of physical layer data channels (e.g., PDSCH) and PDCCH. Each DM-RS is associated with one of these physical-layer channels and, as such, is confined to resource blocks carrying the associated physical layer channel. Each DM-RS is mapped on allocated REs of the time-frequency grid such that the receiver can efficiently handle time/frequency-selective fading radio channels.

The mapping of DM-RS to REs is configurable in both frequency and time domain, with two mapping types in the frequency domain (configuration type 1 or type 2) and two mapping types in the time domain (mapping type A or type B) defining the symbol position of the first DM-RS within a transmission interval. The DM-RS mapping in time domain can also be single-symbol-based or double-symbol-based (i.e., pairs of adjacent symbols). Furthermore, a UE can be configured with one, two, three or four single-symbol DM-RS and one or two double-symbol DM-RS. In scenarios with low Doppler, it may be sufficient to configure front-loaded DM-RS only (i.e., one single- or double-symbol DM-RS), while additional DM-RS will be required in scenarios with high Doppler.

Figure 8A:
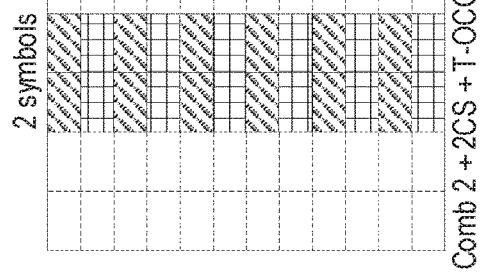
FIGS. 8A-8D, shows four exemplary mappings of front-loaded demodulation reference signals (DM-RS).
Figure 8B:
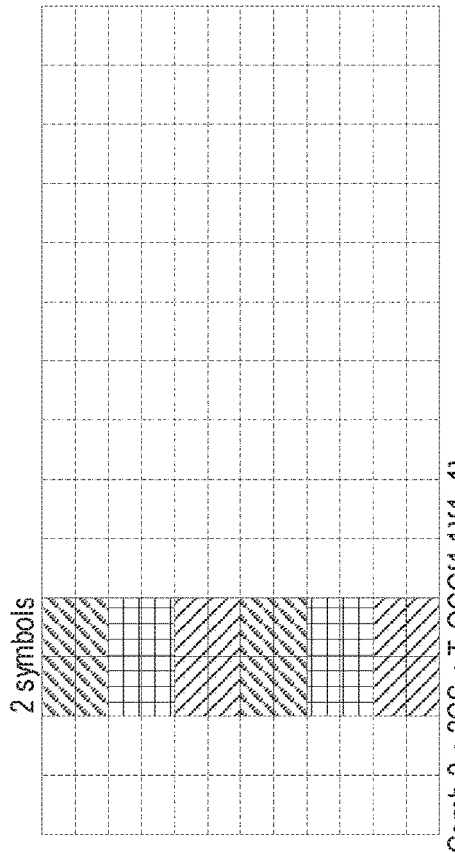
Figure 8C:
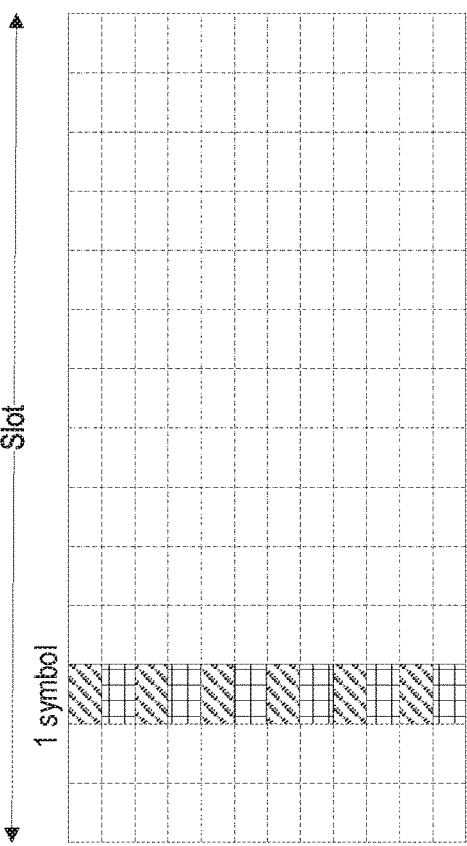
Figure 8D:
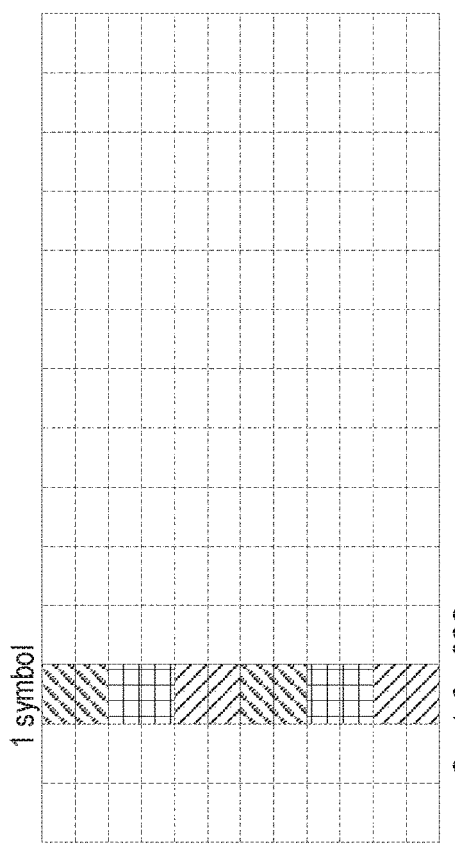

FIG. 8, which includes FIGS. 8A-8D, shows four exemplary mappings of front-loaded DM-RS with type-A time-domain mapping, in which the first DM-RS is in the third symbol of 14-symbol slot. More specifically, FIGS. 8A-8B show mappings for configuration type 1 for single-symbol and double-symbol DM-RS, respectively. Likewise, FIGS. 8C-8D show mappings for configuration type 2 for single-symbol and double-symbol DM-RS, respectively. As illustrated in FIG. 8, type 1 and type 2 mapping differ with respect to both the mapping structure and the number of supported DM-RS CDM groups. As illustrated by the different shadings of the DM-RS REs, type 1 supports two CDM groups (e.g., $\lambda=0,1$) and type 2 supports three CDM groups (e.g., $\lambda=0,1,2$).

The mapping structure of type 1 is sometimes referred to as a 2-comb structure with two CDM groups defined, in frequency domain, by the set of subcarriers {0,2,4, ... } and {1,3,5, ... }. Since it facilitates low peak-to-average power ratio (PAPR) transmissions, the comb mapping structure is used in conjunction with DFT-S-OFDM in the NR UL. In contrast, both type 1 and type 2 mapping are supported for CP-OFDM operation (e.g., in UL and DL).

A DM-RS antenna port is mapped to the REs within one CDM group only. For single-symbol DM-RS, two antenna ports can be mapped to each CDM group, while for double-symbol DM-RS, four antenna ports can be mapped to each CDM group. Hence, the maximum number of DM-RS ports either four or eight for type 1, and either six or twelve for type 2. A length-two orthogonal cover code (OCC) ([+1, +1], [+1, −1]) is used to separate antenna ports mapped on same REs within a CDM group. The OCC is applied in frequency domain as well as in time domain when double-symbol DM-RS is configured.

In NR Rel-15, the mapping of a PDSCH DM-RS sequence r (m), m=0,1, . . . on antenna port p; and subcarrier k in OFDM symbol l for the numerology index μ is specified in 3GPP TS 38.211 according to:

$$a_{k,l}^{(p_j,\mu)} = \beta_{DMRS}^{PDSCH} r_\lambda^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $$r_\lambda^{(p_j)}(2n + k') = w_f(k') w_t(l') r(2n + k')$$

represents the reference signal mapped on port $p_j$ in CDM group □ after applying OCC in frequency domain, $w_f(k')$, and time domain, $w_t(l')$. Tables 2-3 below show the PDSCH DM-RS mapping parameters for configuration type 1 and type 2, respectively.

TABLE 2

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 3

| p | CDM group λ | Δ | $w_f(k')$ k' = 0 | $w_f(k')$ k' = 1 | $w_t(l')$ l' = 0 | $w_t(l')$ l' = 0 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

DCI also includes a bit field that indicates which antenna ports (i.e. the number of data layers) are scheduled. For example, if port 1000 is indicated, then the PDSCH is a single layer transmission and the UE will use the DMRS defined by port 1000 to demodulate the PDSCH. The DCI value also indicates the number of CDM groups without data, which means that if 1 is indicated, the other CDM group contain data for the UE (PDSCH case), and if 2 is indicated, both CDM groups may contains DMRS ports and no data is mapped to the OFDM symbol containing the DMRS. Table 4 below shows bit-field values and corresponding configurations for DM-RS Type 1 with a single, front-loaded DM-RS (maxlength=1).

TABLE 4

| | Codeword 0 enabled, Codeword 1 disabled | |
|---|---|---|
| DCI value | No. of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Antenna Port Indication Tables

For DMRS Type 1, ports 1000, 1001, 1004, and 1005 are in CDM group λ=0 and ports 1002, 1003, 1006, and 1007 are in CDM group λ=1 (also illustrated in Table 2). In contrast, Table 5 shows a corresponding exemplary configuration for DMRS Type 2. For DMRS Type 2, ports 1000, 1001, 1006, and 1007 are in CDM group λ-0; ports 1002, 1003, 1008, and 1009 are in CDM group λ=1; and ports 1004, 1005, 1010, and 1011 are in CDM group λ=2 (also illustrated in Table 3).

TABLE 5

| | Codeword 0 enabled, Codeword 1 disabled | | | Codeword 0 enabled, Codeword 1 enabled | |
|---|---|---|---|---|---|
| Value | No. of DMRS CDM group(s) without data | DMRS port(s) | Value | No. of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

QCL Relation to DMRS CDM Groups

Currently, the 3GPP NR specifications include the restriction that the UE may assume that the PDSCH DM-RS within the same CDM group are quasi co-located with respect to Doppler shift, Doppler spread, average delay, delay spread, and spatial Rx. In cases where a first UE is not scheduled on all DMRS ports within a CDM group, another UE can be simultaneously scheduled for the remaining ports of that CDM group. The first UE can then estimate the channel for that other UE, which is seen by the first UE as an interfering signal. That facilitates coherent interference suppression by the first UE.

Multi-TRP/Multi-Panel/Multi-Beam Extension

As mentioned above, multi-source transmission of PDSCH to UEs has been considered for 3GPP NR Rel-16. This can be used, for example, to improve URLLC performance by transmitting multiple copies of a PDSCH transport block (TB) to a UE from different TRPs, also referred to as "multi-TRP diversity." To support this feature, it has been discussed to extend the TCI state from the Rel-15 pair of two source RS with QCL type 1 and type 2 (e.g., TCI state= {qcl-Type1,qcl-Type2}), to an extended TCI state with two pairs A and B or even three pairs A, B, and C. These options can be expressed as:

$$TCI \text{ state} = \{\{qcl\text{-}Type1, qcl\text{-}Type2\}_A, \{qcl\text{-}Type1, qcl\text{-}Type2\}_B\}, \text{ and}$$

$$TCI \text{ state} = \{\{qcl\text{-}Type1, qcl\text{-}Type2\}_A,$$
$$\{qcl\text{-}Type1, qcl\text{-}Type2\}_B, \{qcl\text{-}Type1, qcl\text{-}Type2\}_C\}.$$

In the above, A, B, and C can represent three different TRPs, three different antenna panels at one gNB, or three different beams in case of FR2 operation (also referred to as "millimeter wave" or mmW for short).

As briefly mentioned above, URLLC is intended to provide a data service with extremely strict requirements on reliability and latency, e.g., data error probabilities as low as $10^{-5}$ or lower and 1 ms end-to-end latency or lower. One technique to address such reliability requirements is diversity transmission of multiple copies of a transport block to a UE from different TRPs. 3GPP Rel-16 supports multi-PDCCH scheduling, whereby multiple PDCCH transmissions are used to schedule multiple PDSCH carrying the transport block, each from a different TRP. However, this diversity increases the UE complexity because the UE must correctly decode the multiple PDCCH (e.g., DCI) in order to receive the multiple PDSCH and thereby benefit from the multi-TRP diversity transmission. This places even greater requirements on PDCCH reliability (e.g., reduced error rates), which is already problematic in some scenarios. The detection of multiple PDCCH also increases UE complexity and consumes multiple PDCCH resources, thereby reducing the possibility to schedule other UEs in the same slot (e.g., increased PDCCH blocking probability). As such, there are various issues, problems, and/or difficulties associated with diversity transmission that need to be addressed to realize the strict reliability requirements associated with URLLC and other services.

Exemplary embodiments of the present disclosure can address these and other issues, problems, and/or difficulties by configuring a UE by a single DCI and/or PDCCH to receive multiple PDSCH in the same set of OFDM symbols of a slot, where each of the multiple PDSCH is a version (e.g., repetition) of the same data payload. Furthermore, exemplary embodiments can configure TCI states for each PDSCH in order to support multi-source (e.g., multi-TRP) transmission. In this manner, PDSCH diversity by multi-TRP transmission can be achieved even with a single PDCCH, which can increase reliability, reduce latency, reduce PDCCH blocking probability, and/or reduce UE complexity.

In the following description, "repetition" of a PDSCH or PUSCH refers generally to multiple copies of a data block (e.g., a transport block, TB) being transmitted in different frequency resources and/or different spatial resources (e.g., MIMO layers), either within a single OFDM symbol during a slot or in multiple OFDM symbols during one or more slots. However, exemplary embodiments of the present disclosure are distinguished from conventional solutions at least because they facilitate transmission of multiple PDSCH in a single OFDM symbol, using non-overlapping frequency resources (e.g., REs or RBs) and/or non-overlapping spatial resources (e.g., layers).

Put differently, certain embodiments facilitate a more generalized repetition of a PDSCH or a PUSCH, where multiple copies of the packet are transmitted in different frequency resource and/or different spatial resources (i.e. MIMO layers) and a single transmission instant in time but possibly also by configuration a transmission in different time occasions (different OFDM symbols in one or more slots). A distinguishing feature from NR release 15 is that multiple PDSCH is transmitted in the same OFDM symbol (non-overlapping (FDM) or overlapping (spatial repetition).

In addition, exemplary embodiments of the present disclosure are distinguished from conventional solutions (e.g., NR Rel-15) at least because each of the multiple repetitions (e.g., of PDSCH) is associated with a source RS (or pair of RS when QCL Type D applies), which can potentially be different for each PDSCH. This can facilitate transmitting different repetitions of the data block from different sources (e.g., TRPs). For practical convenience, the following description will refer to this as assigning a TCI state to each PDSCH of the repetition.

Put differently, certain embodiments facilitate repetition of a PDSCH or a PUSCH, where multiple copies of the packet are transmitted in different frequency resource and/or different spatial resources (or pair of RS(s) in case QCL Type D is applicable), which then can potentially be different for each PDSCH. This allows for repetition of the packet by transmitting from different TRPs. This can in practice be described as assigning each PDSCH a TCI state. This is another exemplary distinguishing feature compared to conventional solutions (e.g., NR Rel-15).

Assigning TCI States Per PDSCH Repetition

Various exemplary embodiments can assign a TCI state to each PDSCH in various ways. In some embodiments, the TCI state for each PDSCH can be configured by RRC or MAC control element (CE), e.g., by letting a MAC CE indicate a set of multiple active TCI states. For example, a MAC CE can indicate a set of two, four, or eight active TCI states, and each of the PDSCH repetitions can use the active states comprising the set in a pre-defined order (e.g., cyclic order) that is non-overlapping with the predefined orders associated with the other PDSCH repetitions. As a more specific example, the 2, 4, or 8 active TCI states that are selected by MAC CE in NR Rel-15 can also be used for PDSCH repetition in a cyclic manner. For example, each PDSCH use one of the activated TCI states in a pre-defined order.

Alternately, in order to give the network scheduler more flexibility in selecting multiple sources (e.g., TRPs) to be used in the PDSCH repetitions, the selected active TCI state can be indicated in the scheduling DCI for the PDSCH repetitions. In other words, the DCI can select among the activated TCI states when scheduling the PDSCH with repetition. Table 6 below shows an exemplary arrangement where the set of active states for PDSCH repetitions (e.g., TCI states 0-3) can be configured by RRC or MAC CE, but the assignment of individual active TCI states to individual PDSCH repetitions is provided by DCI on PDCCH. In this example, a two-bit DCI field selects a table row that has a specific assignment of the four active TCI states to four PDSCH repetitions transmitted by four different sources (e.g., TRPs or beams). In other words, the content of Table 6 (in italics) can be configured by RRC and/or MAC CE, then a two-bit DCI field (as used in this example) selects a row in the table.

In the embodiments illustrated by Table 6, below, the scheduler can also dynamically select which TRPs are involved in the repetition by DCI value. This could be beneficial, for example, if certain TRPs are busy with transmissions to other UEs. For example, DCI=00 involves four TRPs, each assigned a different active TCI state. In contrast, the schedule can restrict the PDSCH repetition by selecting the second row (e.g., with DCI=01) or third row (e.g., with DCI=10), each of which involve only two TRPs, with each TRP being assigned two different active TCI states. It is also possible to configure a row where only a single TRP is used, such as the fourth row indicating that only TCI state 0 is used for all repetitions. This row can be selected by DCI=11. It is also possible that the number of repetitions is greater than the number of columns in the configured table (i.e., >4 in this example). Such embodiments can employ a wrap-around or modulus operation on the repetitions (e.g., repetition 4 uses the same TRP as repetition 0, etc.).

TABLE 6

Example of mapping TCI state value to TCI states to be used for each PDSCH repetition, where the italics values (TCI states) in the table are configured by RRC.

| TCI state indicator bit value in DCI | PDSCH repetition 0 | PDSCH repetition 1 | PDSCH repetition 2 | PDSCH repetition 3 |
|---|---|---|---|---|
| 00 | *TCI state #0* | *TCI state #1* | *TCI state #2* | *TCI state #3* |
| 01 | *TCI state #0* | *TCI state #1* | *TCI state #0* | *TCI state #1* |
| 10 | *TCI state #0* | *TCI state #2* | *TCI state #0* | *TCI state #2* |
| 11 | *TCI state #0* | *TCI state #0* | *TCI state #0* | *TCI state #0* |

In some embodiments, the number of time-domain repetitions can be encoded and conveyed via the TCI field in DCI, instead of being semi-statically configured via the RRC parameter pdsch-AggregationFactor. For instance, each RRC-configured candidate TCI state can be associated with a number of time-domain repetitions. In other embodiments, a separate RRC configuration parameter maps each codepoint of the TCI field in DCI to a number of repetitions and may additionally configure the mapping order of activated TCI states to PDSCH repetitions, similar to the arrangement shown in Table 6 above. In other embodiments, a MAC CE TCI state activation message comprises an indication of the number of repetitions associated with a codepoint of the TCI field in DCI, in addition to which TCI state candidates are mapped to which codepoint of the TCI field.

In Rel-15 NR, the number of bits in the TCI field of DCI is 0 or 3, depending on whether the higher layer parameter tci-PresentInDCI is enabled. Hence, a total of eight TCI codepoint values can be indicated with this three-bit field. According to 3GPP TS 38.321, when two TCI states are activated, then these activated TCI fields are mapped to the first two TCI codepoint values (i.e., '000' and '001') of the TCI field in DCI. In such case, the remaining six TCI codepoint values (i.e., '010', '011', '100', '101', '110', and '111') do not have any activated TCI states mapped to them. More generally, in NR Rel-15, if N<8 TCI states are activated by a MAC CE, then 8-N codepoint values will not have any active TCI states mapped to them.

Accordingly, in some exemplary embodiments, when N TCI states are activated out of a maximum M TCI states (e.g., M=8) and N<M, the M-N unused codepoint values can be used for multi-TRP repetition of PDSCH. For example, each PDSCH transmitted from a different TRP uses one of the activated TCI states in a pre-defined order. The first N codepoints are used for single TRP transmission with a single TCI state as in NR Rel-15. As such, this embodiment facilitates dynamic switching between single-TRP transmission and multi-TRP transmission with PDSCH diversity.

As briefly mentioned above, the PDSCH repetitions can be mapped across different frequency resources (e.g., within a symbol) or across layers in the same frequency resource (e,g., spatial repetition on the same REs). In some embodiments, time-domain PDSCH repetitions can be configured, which can facilitate an even larger number of repetitions. In this case, the modulus or wrap-around scheme discussed above can be used so TRPs are cyclically selected for each transmitted PDSCH. For example, if a repetition of two is configured in both frequency and time domains, then repetitions 0 and 1 are in the same, first set of OFDM symbols and repetitions 2 and 3 are in a second set of OFDM symbols occurring later, such as in the next available DL slot.

In some embodiments, the DCI can also contain information about whether PDSCH repetition (e.g., according to the RRC-configured resources per repetition) should apply. In the PDCCH region of a slot, there can be many places where a specific PDCCH is located, which differ based on whether the PDCCH is UE-Specific or Common as well as the aggregation level (AL) used. Each PDCCH carries one DCI and is identified by a Radio Network Temporary Identifier (RNTI), which is implicitly encoded in the CRC attachment of the DCI. In some embodiments, the PDCCH RNTI can be used to distinguish whether PDSCH repetition should apply. For example, repetition is not applicable if PDCCH is associated with a cell RNTI (C-RNTI) but is applicable according to previous higher layer configuration if PDCCH is associated with a Modulation Coding Scheme Cell RNTI (MCS-C-RNTI).

In order to increase reliability of a data packet, the data payload can be encoded with different redundancy versions (RV). This is commonly used in LTE and NR in retransmissions, where in each retransmission a different RV is used (e.g., RV=0, 1, 2, 3, etc.). In NR it is possible to schedule a PDSCH or PUSCH with time repetition, based on the RRC parameters pdsch-AggregationFactor or pusch-AggregationFactor, respectively, for dynamic scheduling; and repK for PUSCH with UL configured grant. In this case, the PxSCH is scheduled but transmitted in multiple adjacent slots up until the number of repetitions as determined by the configured RRC parameter.

In some embodiments, each PDSCH repetition can also carry a different redundancy version (RV) of the data comprising the transport block (TB) when mapped to different frequency resources in the same set of OFDM symbols. The mapping between RVs and PDSCH repetitions/TRPs can be indicated, for example, by a field in DCI. Table 7 below shows an exemplary arrangement where a two-bit DCI value indicates one of four mappings between RVs and individual PDSCH repetitions.

TABLE 7

Example of mapping indicated redundancy version value to RV to be used for each PDSCH repetition, where the italics values (TCI states) in the table are configured by RRC.

| RV value in DCI | PDSCH repetition 0 | PDSCH repetition 1 | PDSCH repetition 2 | PDSCH repetition 3 |
|---|---|---|---|---|
| 00 | *RV #0* | *RV #1* | *RV #2* | *RV #3* |
| 01 | *RV #1* | *RV #0* | *RV #1* | *RV #2* |
| 10 | *RV #2* | *RV #3* | *RV #0* | *RV #1* |
| 11 | *RV #3* | *RV #0* | *RV #1* | *RV #2* |

Although the above discussion was based on dynamically scheduled PDSCH in which each transmission has an associated scheduling DCI, similar techniques can be applied to semi-persistently scheduled (SPS) PDSCH in which each transmission does not have an associated DCI. For example, the UE can receive PDSCH on the RRC-configured resource after receiving a DCI with CRC scrambled by CS-RNTI, which activates the SPS resources. In this manner, the content of the TCI state table can be configured by RRC IE, and a subsequent activation DCI can select a table row to apply to the PDSCH of corresponding DL SPS process.

Frequency Resource Allocation

In order to support frequency-division multiplexed (FDM), multi-TRP PDSCH transmissions, multiple frequency resources must be assigned and/or defined, one per PDSCH repetition. Such assignment facilitates TCI state cycling, or more precisely the cycling of source RS for QCL relation between the source RS and each PDSCH DMRS. In some embodiments, multiple (e.g., N>1) resources of fixed size (e.g., number of PRBs and/or number of OFDM symbols per resource) can be pre-configured using higher-layer signaling via RRC and/or MAC CE. Subsequently, a DCI triggering PDSCH repetition transmission can initiate or trigger use of these pre-configured resources.

In other embodiments, a DCI can include a scheduling of a single primary PDSCH resource plus an indication of repetition of an additional N-1 PDSCH(s) in the same OFDM symbols as the primary PDSCH. For example, the placement or location of the resources for these additional PDSCH(s) can be indicated relative to the primary PDSCH resource, e.g., using a frequency offset measured in terms of RBs, precoding RB groups (PRGs), or RB groups (RBG). The indication of the relative offset to each PDSCH can be configured by higher layers such as RRC or MAC CE. In some variants, the relative offset value can depend on the scheduled width of the primary PDSCH in the frequency domain, the bandwidth of the carrier, and/or the bandwidth of the BWP containing the primary resources.

In some embodiments, the network (e.g., serving gNB) can configure multiple UEs with the same offset value and schedule the multiple UEs using primary PDSCH resources that are adjacent in the frequency domain. In this manner, the frequency-domain PDSCH repetition resources for each UE can be arranged in a comb-like pattern, such that PDSCH repetitions for multiple UEs can be scheduled with non-overlapping PDSCH combs. This can facilitate a preferred and/or optimal (e.g., full) use of the available frequency resources while providing frequency diversity for each scheduled UE.

In other embodiments, virtual RB (VRB) assignment can be used and the multiple PDSCH repetitions can be always allocated in VRBs that are subsequent to the VRB allocation of the primary PDSCH resource. In these embodiments, frequency-diversity can be achieved by configuring a VRBto-PRB mapping that distributes the PDSCHs across frequency. This VRB-to-PRB mapping can be preconfigured via RRC, indicated in DCI from a set of RRC configured candidates using a DCI VRB-to-PRB indicator field, or encoded in the TCI state. The VRB-to-PRB mapping can also be PDCCH-specific and depend on the actual resource allocation of the PDSCH, such that each repeated PDSCH can always be mapped to contiguous PRBs.

In some embodiments, a relative offset can be represented by the TCI state indicator provided in the DCI, thereby facilitating the scheduler to dynamically select the value N. Each TCI state can be configured with one or multiple resource allocation offset values offset #n. Table 8 below shows an exemplary variation of Table 6 above, in which TCI state indicator values in DCI also map to particular offsets for respective PDSCH repetitions. As in Table 6, DCI=00 implies transmission from four different TRPs, but also at three different offset values (that can be configured by higher layers) relative to the primary PDSCH. On the other hand, if the TCI state DCI indicates '01' or '10', then only two TRPs are used and the second PDSCH is transmitted at an offset #1 relative to the primary PDSCH.

Alternatively, the higher layers can directly configure the exact resource allocation for all the repetitions and map this to such a table (Table 8) without the need for a relative offset to the primary PDSCH.

In some embodiments, if a frequency offset of a PDSCH repetition falls outside of the assigned BWP, the repetition can be discarded. Alternately, a modulus approach can be applied to wraparound the PDSCH repetition to resources in the lower end of the BWP.

TABLE 8

Example of mapping TCI state and resource allocation offset value to TCI states to be used for each PDSCH repetition, where italics values in the table are configured by RRC.

| TCI state indicator bit values in DCI | PDSCH repetition 0 | PDSCH repetition 1 | PDSCH repetition 2 | PDSCH repetition 3 |
|---|---|---|---|---|
| 00 | *TCI state #0* | *TCI state #1, offset #1* | *TCI state #2, offset #2* | *TCI state #3, offset #3* |
| 01 | *TCI state #0* | *TCI state #1, offset #1* | | |
| 10 | *TCI state #0* | *TCI state #2, offset #1* | | |
| 11 | *TCI state #0* | *TCI state #0, offset #1* | *TCI state #0, offset #2* | *TCI state #0, offset #3* |

Semi-Persistent Transmission of PDSCH

The embodiments described above that utilize relative frequency offsets can also be applied to SPS PDSCH (e.g., each transmission does not have an associated DCI) according to similar principles. For example, the UE can receive PDSCH on RRC-configured DL-SPS resource after a DCI with CRC scrambled by CS-RNTI activates the pre-configured DL-SPS resources. The content of the TCI state and offset table (e.g., Table 8) can be configured by RRC IE, and a subsequent activation DCI can select a table row to apply to the SPS PDSCH.

Support for Spatial Repetition of PDSCH

Other exemplary embodiments can configure PDSCH transmissions on resources that are overlapping in the frequency domain but non-overlapping in the spatial domain. This can be efficient in terms of bandwidth used at the expense of increased UE receiver complexity needed to support multi-layer reception, including inter-layer interference cancellation. Even so, for large data blocks, it may not be possible to frequency-multiplex multiple PDSCH repetitions, in which case spatial repetition of PDSCH is the only possibility. In some embodiments, PDSCH repetitions can be configured in both frequency and spatial domains, e.g., N=4 repetitions in two different frequency resources, where each frequency resource carries a spatial repetition of two PDSCHs.

In such embodiments where at least two of the N PDSCH repetitions in a slot or in the same set of scheduled OFDM symbols are allocated to the same frequency resources, the selection of DMRS ports per PDSCH are different so that they are orthogonal which ensures good performance of channel estimation. Put differently, the DMRS ports for each PDSCH can be configured to be orthogonal to other PDSCH repetitions that overlap in the frequency domain, which facilitates good channel estimation performance. The DMRS assignment to PDSCH can be accomplished in several ways, as described below.

In some embodiments, a different set of DMRS ports can be configured for each TCI state. This can be done by higher layer signaling, such as by including DMRS ports in the TCI state configuration made, for example, by RRC or MAC CE. To comply with the NR Rel-15 requirement that all ports in a CDM group must be mutually QCL, different TCI states can be associated with DMRS ports of different CDM groups. For example, if DMRS Type 1 is configured, TCI_state #0 can use DMRS ports 1000 and 1001, while TCI_state #1 can use DMRS ports 1002 and 1003. If rank 1 is scheduled per PDSCH, then the first port of each TCI_state can be used (e.g., ports 1000 and 1002). On the other hand, if rank 2 is scheduled per PDSCH, then both ports from the associated CDM group can be used.

In other embodiments, a different set of DMRS ports can be configured for each PDSCH repetition. For example, assume that each repetition can be identified with an order number (e.g., based on frequency resource allocation configuration). In such case, among PDSCH repetitions in an overlapping resource, the PDSCH with the lowest number can be configured to use DMRS ports from the first CDM group, the next-lowest-number PDSCH can be configured to use DMRS ports from the second CDM group, and so on. In another variant, if two PDSCH have the same TCI state (e.g., transmitted from the same TRP), then DMRS ports are selected from the same CDM group (since they are QCL), while a PDSCH having a different TCI state can use DMRS port from the next CDM group.

As an illustrative example, consider a transmission of four overlapped PDSCH, transmitted pairwise from two TRPs configured with DMRS type 1. The first two PDSCH can use the same TCI state and thus can be assigned DMRS ports 1000 and 1001 (CDM group)=0), while the third and fourth PDSCH can use another TCI state and thus can be assigned DMRS ports 1002 and 1003 (CDM group $\lambda$=1).

More general rules can also be defined, such as DMRS port numbers are incremented with a CDM group, for PDSCH(s) having the same TCI state and DMRS ports of the next TCI state is assigned to the next CDM group. Such rules can facilitate support for two TRPs configured with DMRS type 1 (two CDM groups), and three TRPs configured with DMRS Type 2 (three CDM groups).

Data Scrambling

In other embodiments, when multiple PDSCH repetitions are overlapping in frequency resources, different scrambling can be configured for each PDSCH. This can provide performance benefits, such as seen in LTE and NR for two-codeword (CW) transmission in one PDSCH. Different scrambling can be configured by defining different scrambling initialization seeds for each CW. In Rel-15, the initialization seed for generating the scrambling is defined by $$c\_init = 2^{15} * n\_RNTI + 2^{14} * q + n\_ID,$$

where n_RNTI is the RNTI for the scheduled PDSCH, q is the CW index {0,1}, and n_ID is a UE-specific, RRC-configured value. In order to achieve per PDSCH scrambling in the overlapped case, the above relation can be modified according to:

$$c\_init = 2^{15} * n\_RNTI + 2^{14} * q + n\_ID + 2^{10} * N,$$

where N=0, 1, 2, . . . is the identifier for a particular PDSCH repetition. In some embodiments, N can be incremented for each overlapping PDSCH in a given resource, with N=0 reused again for the lowest-numbered PDSCH in the next frequency resource with overlapping PDSCH. In other embodiments, N can be incremented sequentially for all PDSCH transmitted in the same set of OFDM symbols or same slot (e.g., without reset to zero).

In a variant of these embodiments, each repeated copy of the PDSCH can be configured to be associated with an n_ID value that is separately configured, e.g., by RRC as a general configuration applicable to PDSCH repetitions with any involved TRPs. Alternatively, different n_ID values can be indirectly associated with the scheduled repetitions by being configured for association with a TCI state or a QCL source.

Analogy to PUSCH Transmission

Although the above description focuses on PDSCH repetitions, the described principles can also be applied to PUSCH repetitions together with certain appropriate modifications. For example, there are no PUSCH TCI states defined in Rel-15, although such a feature could be introduced in the future. Alternatively, the SRS resource indication (SRI) can fulfil the same role as the TCI state does for PDSCH. For example, SRI cycling can be used across PUSCH transmissions in a similar manner as TCI state cycling discussed above, with the same data block carried in each PUSCH repetition (with a different RV, as needed). Furthermore, each SRI can indicate a particular UE antenna panel that can transmit individually, thereby providing spatial diversity in the PUSCH repetitions.

Furthermore, DMRS port selection and data scrambling selection of PUSCH can be based on the same principles as discussed above for PDSCH. Even so, for PUSCH there are no requirements that the DMRS ports within the same CDM group must belong to the same SRI (i.e., the same panel). Hence, for PUSCH the DMRS ports may be allocated linearly without considering (e.g., independent of) CDM groups.

In PUSCH repetition embodiments, it can be beneficial to allocate frequency-domain resources for the PUSCH repetitions in a contiguous block (e.g., consecutive PRBs) of an OFDM symbol. In such case, the per-repetition frequency resource offset may not need to be signaled explicitly as for PDSCH. Rather, the offset between two adjacent repetitions of a PUSCH can be implicit from the number of PRBs used for a single repetition of the PUSCH.

For semi-persistent UL scheduling, two types of UL configured grants (CGs) are provided in Rel-15. The Type-2 CG is very similar to DL SPS, whereby the UE can transmit PUSCH on the RRC-configured resource after a DCI with CRC scrambled by CS-RNTI activates the UL CG resources. As such, embodiments described above for DL SPS can be applied for use with Type2 UL CGs. For example, the content of an SRI state table can be configured by RRC IE, after which an activation DCI selects a table row to apply to the SPS PUSCH.

In contrast, for Type-1 UL CGs, the PUSCH transmission can only be configured by RRC; no activation DCI is involved. As such, all configuration of PUSCH repetitions should be provided via RRC. For example, the RRC configuration of Type-1 UL CG provides the sequence of SRI states to use (e.g., similar to the row of TCI states shown in Table 6).

Configurable Repetition Patterns

In other embodiments, multiple repetition patterns can be configured by RRC, with each pattern indicating time and/or frequency resources, spatial relations (or TRP or TCI state), RVs, and/or DMRS ports for PDSCH (or PUSCH) repetitions subsequently scheduled by DCI. For K PDSCH (or PUSCH) transmissions, a repetition pattern can include K-1 states, $\{(t_2, f_2, s_2, v_2, d_2), \ldots, (t_K, f_K, s_K, v_K, d_K)\}$, each state associated with one PDSCH (or PUSCH) transmission instance. The tuple $(t_k, f_k)$ represents the time and frequency resources for the kth transmission, while the tuple $(s_k, v_k, d_k)$ represents TCI state, RV, and DMRS ports associated with the kth transmission, respectively. The DMRS ports may be configured as an index in the first column of Table 4 or Table 5. The time and frequency resources, spatial relation (or TCI state), RV version, and/or DMRS ports for the first PDSCH (or PUSCH) transmission can be indicated by bit fields in the DCI used to schedule the PDSCH/PUSCH repetitions, in a similar manner as described with reference to the various tables. The repetition pattern to be used can be dynamically selected from the configured multiple repetition patterns and can also be indicated to the UE using a bit field in the scheduling DCI.

In some embodiments, $(t_k, f_k)$ can represent time and frequency offsets, respectively, relative to the time and frequency resource for the first PDSCH (or PUSCH) transmission or, more generally, for the (k-1)th PDSCH (or PUSCH) transmission. The time resource offset can be in terms of slots, mini-slots, or OFDM symbols, and the frequency offset can be in terms RBs, precoding RB groups (PRGs), or RBGs. The condition $t_k=t_{k-1}$ indicates that the kth and the (k-1)th transmissions used the same time resource. Similarly, if $f_k=f_{k-1}$, the kth and the (k-1)th transmissions use the same frequency resource. If both $t_k=t_{k-1}$ and $f_k=f_{k-1}$, but $s_k \neq s_{k-1}$, then the kth and the (k-1)th transmissions are in the same time and frequency resource but from different spatial resources (e.g., TRPs or panels). In some embodiments, one or more of $(t_k, f_k, s_k, v_k, d_k)$ can be predefined or implicitly related and/or linked to other parameters.

Figure 9:
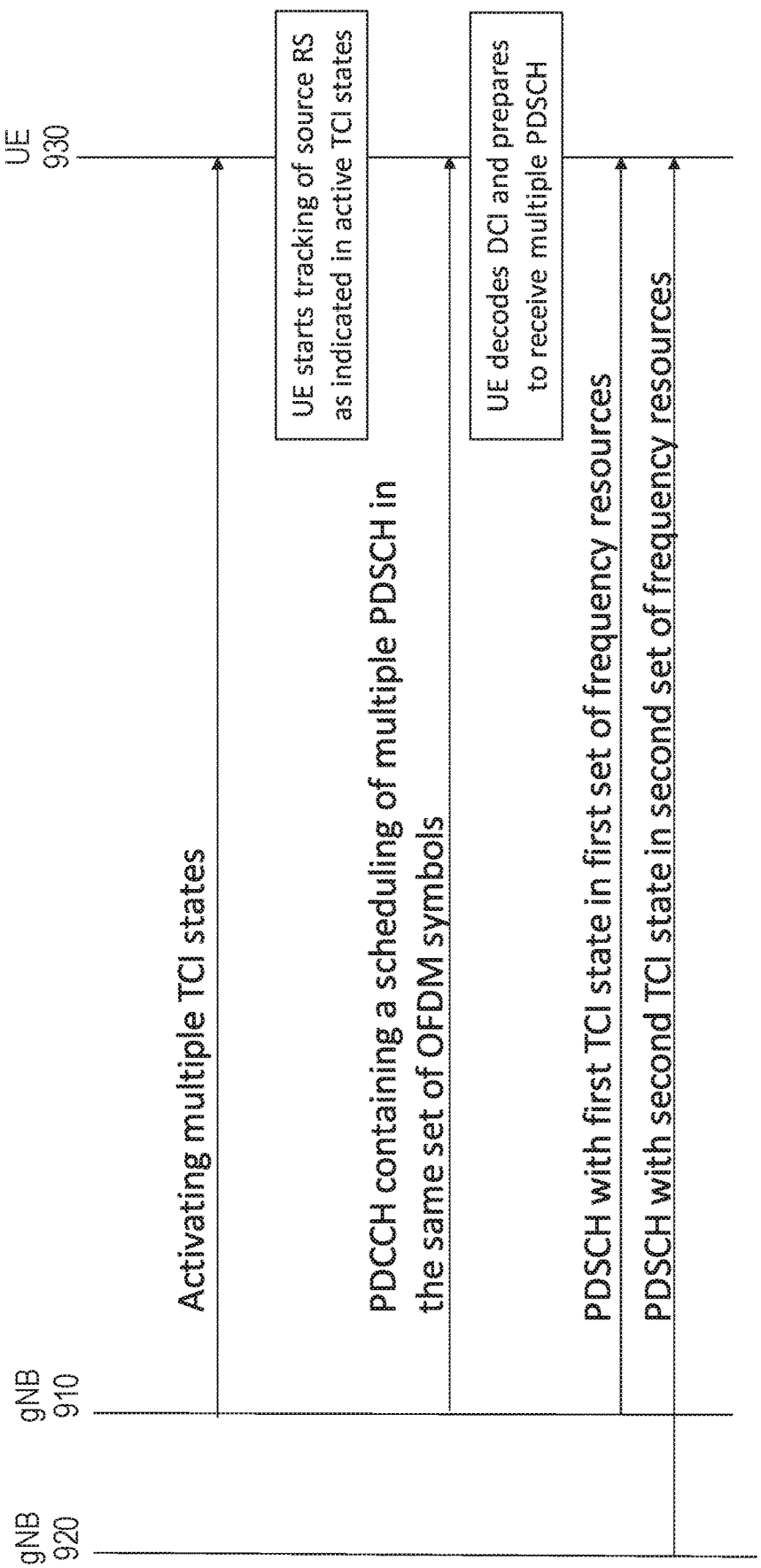
FIGS. 9-10 show flow diagrams for exemplary operational scenarios in which a UE communicates with two gNBs that can provide PDSCH diversity transmission, according to various exemplary embodiments of the present disclosure.

FIG. 9 shows an exemplary operational scenario in which a UE communicates with two gNBs that can provide PDSCH diversity transmission, according to various exemplary embodiments of the present disclosure. In this example, the resources for the PDSCH repetitions are non-overlapping in frequency. The UE can be configured by gNB1 (e.g., by MAC CE activation) to actively track multiple TCI states. The UE begins to track these multiple TCI states by performing measurements on the associated RS for each TCI state. Note that the RS associated with a TCI state is transmitted from the same gNB as the PDSCH associated with the same TCI state.

The UE then receives a DCI that schedules multiple PDSCH in one slot, e.g., in the same set of OFDM symbols. The UE then receives these multiple PDSCH (typically containing the same data block, optionally with different RVs), according to a different active TCI state associated with each PDSCH repetition. As such, the different repetitions can be transmitted by different TRPs, shown in FIG. 9 as gNB1 and gNB2.

Figure 10:
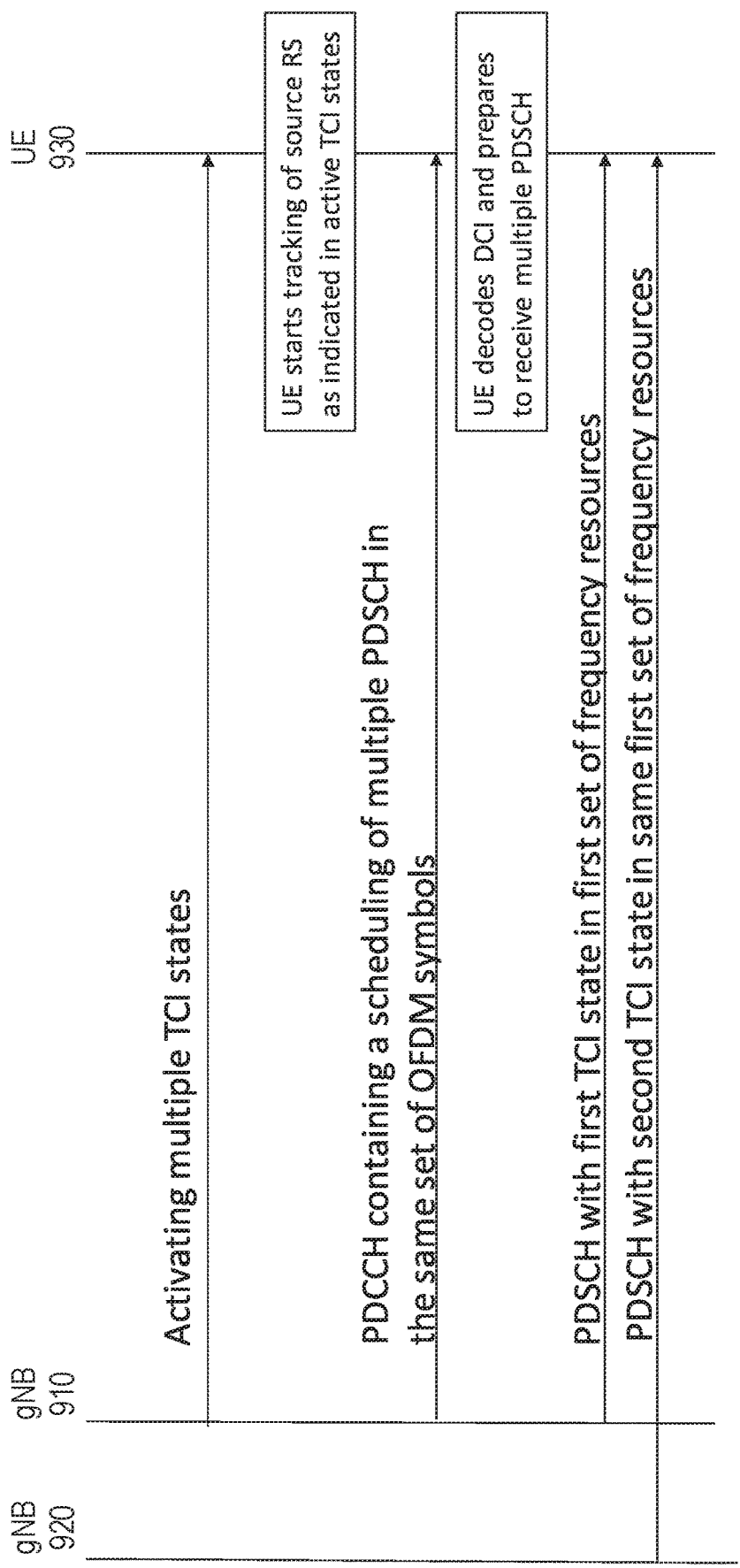

FIG. 10 shows another exemplary operational scenario in which a UE communicates with two gNBs that can provide PDSCH diversity transmission, according to other exemplary embodiments of the present disclosure. In this scenario, the resources for the PDSCH repetitions are overlapping in frequency but spatially non-overlapping, creating a multi-layer MIMO transmission of two PDSCHs. Each PDSCH may contain more than one layer. In some embodiments, the UE can signal support for this PDSCH repetition mode of layered PDSCH prior to the network configuring the UE in this manner.

Various embodiments of the present disclosure, including those described above, can be implemented within the framework of one or more 3GPP TSG RAN specifications (e.g., multi-TRP operation in NR Rel.16). The following description illustrates how certain aspects and/or enhancements related to these embodiments can be specified and/or standardized in an exemplary manner (e.g., based on proposals and observations). However, these and other aspects and/or enhancements can be specified and/or standardized in other suitable ways, such as in 3GPP specifications and/or in other specifications or standards.

Category 1: Multi-PDCCH Based Multi-TRP Scheduling

In this mode of operation, multiple PDCCHs may be received in a slot and each PDCCH schedules one PDSCH. In general, Rel-15 NR can in principle be reused, including configuration of TCI states per CORESET and for PDSCH, DMRS scrambling. So not much specification changes are envisioned for this mode of operation.

In multi-PDCCH scheduling, there will be an implementation based semi-dynamic coordination between schedulers of the different TRPs. The complexity of this coordination can be simple, by semi-static to semi-dynamic reservation of resources, depending on the bounds of the backhaul latency. Due to the various deployment conditions, it is hard to make an assumption for RAN1 specification guidance of what kind of scheduler coordination will be used.

Therefore, it is better to focus on what is expected by the UE, what scheduling scenarios should the UE be prepared to handle, and what scheduling combinations can the UE ignore in its implementation to limit the complexity. Therefore, it is suggested RAN1 focus on the requirements on the UE and agree on what scheduling conditions the UE is not required to support.

Proposal: Each PDCCH for a UE supporting multi PDCCH reception schedules one PDSCH (at least for eMBB) and the Rel.16 UE is not expected to be scheduled with
  Partially overlapping PDSCHs in time- and frequency-domain resource allocation.
  More than one PDSCH with DMRS in the same CDM group for overlapping PDSCH resource allocations.
  An aggregated number of layers across all PDSCHs in an overlapping time-frequency resource that is greater than the maximum number of UE supported/configured layers
  An aggregated number of CWs across all PDSCHs in an overlapping time-frequency resource that is greater than two This means that when overlapping PDSCH scheduling occurs, at most one CW is supported per PDSCH, and thus only ranks 1-4 need to be supported per PDSCH in this multi-PDCCH case.

Regarding monitoring and receiving multiple PDCCHs, it has to be shown that there is an issue with search space capacity or blocking since the gains of multi-TRP transmissions are only visible at low load and thus the demands on the required PDCCH capacity is low. Configuring multiple CORESETs are already supported (with individual TCI state) in case per TRP PDCCH is desirable to be configured.

i. Antenna Port Indication Tables

To support multi-TRP transmission, the DMRS port transmitted from one TRP must belong to the same CDM group. Hence, the antenna port tables must be able to indicate a flexible number of layers within a CDM group per TRP.

The Rel-15 tables for DMRS Type 1 support scheduling of these layers (L1, L2) in the first and second CDM group respectively:
  (L1, L2)=(1,0), (2,0), (0,1), (0,2) for a single DMRS symbol
  (L1, L2)=(1,0), (2,0), (3,0), (4,0), (0,1), (0,2), (0,3), (0,4) for double DMRS symbols Hence, there is no need to update the antenna port table for multi-PDCCH scheduling in case of DMRS Type 1. A PDCCH can indicate 1-4 layers flexibly from those layers contained within any CDM group.

Note that when DMRS ports from the 2nd CDM group is indicated by one PDCCH by the use of the Rel-15 antenna port indication table (e.g. a rank 2 scheduling with port 2,3), then that associated PDSCH cannot be mapped to the 1st CDM group (since both CDM groups are indicated "without data" in current table). However, selection of one CDM group only by a PDCCH occurs only when one TRP is transmitting and then the semi-dynamic coordinating scheduler can instead indicate that the TRP should use DMRS in the 1st CDM group (e.g port 0,1). Hence, the Rel-15 antenna port indication table can be used unchanged where the 2nd CDM group is only used when the 1st CDM group is also used for DMRS.

The Rel-15 tables for DMRS Type 2 support scheduling of these layers (L1, L2, L3) in the first, second and third CDM group respectively:
  (L1, L2, L3)=(1,0,0), (0,1,0) (0,0,1), (2,0,0), (0,2,0), (0,0,2) for a single DMRS symbol
  (L1, L2, L3)=(1,0,0), (0,1,0) (0,0,1), (2,0,0), (0,2,0), (0,0,2), (3,0,0), (0,3,0), (0,0,3), (4,0,0), (0,4,0), (0,0,4) for double DMRS symbols Hence, there is no need to update the antenna port table for multi-PDCCH scheduling in case of DMRS Type 2. A PDCCH can indicate 1-4 layers flexibly from and contained within any CDM group.

Proposal: For multi-PDCCH operation, the Rel-15 antenna port indication tables can be reused without modification.

ii. PDSCH Rate Matching

PDSCH rate matching is important for multi-TRP scheduling since semi-static RS and channel configurations in more than one TRP must be considered. For example, in the multiple PDCCH approach, the UE may in some slots receive multiple PDCCHs scheduling PDSCHs that indicate different PDSCH resource mapping information. If and how the UE should perform PDSCH resource mapping (i.e., PDSCH rate matching) in this case is an open problem as the NR Rel-15 only specifies receiving a single PDDCH scheduling single PDSCH at the same time. Moreover, the different TRPs have different configurations of TRS and LTE CRS (when applicable). Hence, it is proposed:

Proposal: Support mechanisms to extend PDSCH resource mapping around multiple reserved resources from different gNBs, i.e. configured CORESET, ZP-CSI-RS-ResourceSet and lte-CRS-ToMatchAround including dynamic resource mapping around detected PDCCHs.

Category 2: Single PDCCH Based Multi-TRP Scheduling i. Codeword to Layer Mapping and Number of CWs An open issue for discussion is whether to keep the Rel-15 codeword to layer mapping also when deploying multi-TRP transmission with a single PDSCH, or whether there are benefits to consider a specification change in the mapping. In NR, a single CW is mapped to up to 4 layers and thus there are two options to consider on CW to TRP mapping in Rel-16, i.e.

Option 1 (new mapping): For a scheduled PDSCH, one individual CW transmitted for each TRP.

Option 2 (Rel-15 mapping): For a scheduled PDSCH, one CW transmitted and mapped across all TRPs.

In Option 1, since different MCS can be allocated to different CWs each mapped to a TRP, it has the potential benefit of better link adaptation when the pathloss differences to different TRPs are quite large. In case of decoding error on one CW, only that CW needs to be retransmitted. The drawback is that to support more than two TRPs there is a large spec needed change as each CW is associated with a HARQ-ACK. In addition, the current CW to layer mapping needs to be extended to support two CWs for 2, 3 and 4 layers and the issue of semi-static or dynamic switching between Rel-15 and Rel-16 codeword to layer mapping needs to be addressed. Furthermore, two CWs means overhead for additional CRC comparing to a single CW.

For Option 2, it can be supported with existing Rel-15 CW to layer mapping and thus no specification change is required. Hence, each layer is associated to a certain TRP by the use of the DMRS CDM groups. Up to three TRPs can be supported with a single PDCCH and a single PDSCH by the use of all three CDM groups and extended TCI states (see Section 2.2.2). The drawback may be that since a single CW and thus a single MCS is used, when the pathloss differences to multiple TRPs are large, link adaptation may not be as good as using separate MCS per TRP. However, this is not the operating point for NC-JT anyway, since if pathloss difference is large, it's better to transmit all layers from the best TRP.

As was observed already in Rel. 15 discussions of multi-TRP, option 2 slightly outperforms Option 1. Similar results were also observed by additional companies, e.g. in 3GPP Tdoc R1-1900731 for NC-JT in indoor scenario (see FIG. 3 of [8]). One reason is that for NC-JT to perform better than DPS, the UE should be at the cell edge and have comparable pathlosses to both TRPs and in this case, the per TRP based link adaptation does not provide benefits. Another reason is the multi-MCS based link adaptation is more sensitive to CSI feedback delays and errors compared to the single MCS approach. It is also observed a slightly higher retransmission probability for Option 1. A similar result was shown in 3GPP Tdoc R1-1900731, that for single TRP MIMO, single CW performs better than two CWs for ranks up to 4.

TABLE 9

NC-JT Performance comparison between the new (Option 1) and Rel-15 (Option 2) CW to layer mapping.

| | Cell edge UE throughput gain | | Mean UE throughput gain | |
|---|---|---|---|---|
| RU | Option 1 (two CWs) | Option 2 (Rel-15) (single CW) | Option 1 (two CWs) | Option 2 (Rel-15) (single CW) |
| 10% | 0% | 8% | 0% | 5% |
| 20% | 0% | 7% | 0% | 6% |
| 30% | 0% | 4% | 0% | 7% |
| 40% | 0% | 5% | 0% | 8% |
| 50% | 0% | 7% | 0% | 8% |
| 60% | 0% | 6% | 0% | 7% |

NC-JT with Option 2 (a single CW) slightly outperforms NC-JT with Option 1 (two CWs) in indoor scenario. Given that Option 2 slightly outperforms Option 1 in the most promising NC-JT scenario of indoor, and does not need any change of the existing CW to layer mapping, there is no reason to change the mapping in Rel-16. In addition, the multi-PDCCH approach can be used if there is a strong desire from deployment in some scenario to perform per TRP MCS adaptation.

Proposal: RAN1 concludes that there is no change in CW to layer mapping and number of CWs per transmission rank in Rel-16.

ii. Extended TCI States

To support multi-TRP transmission with a single PDCCH, the DMRS ports transmitted from each TRP must belong to the same CDM group. As there are two and three CDM groups for DMRS Type 1 and 2 respectively, up to three TRP transmission can be supported. The TCI state then needs to be extended to contain more than one source RS per QCL type. The following proposal is made:

A TCI state can be configured with one, two or three source RS pairs for QCL when UE is configured for DMRS Type 1 and 2 respectively and source RS pair $\lambda$ can be used to derive QCL properties for the DMRS ports of CDM group $\lambda$:

For DMRS Type 1, a TCI state may be configured to contain: $\{\{qcl\text{-}Type1, qcl\text{-}Type2\}_{\lambda=0}, \{qcl\text{-}Type1, qcl\text{-}Type2\}_{\lambda=1}\}$ for each of the two CDM groups respectively For DMRS Type 2, a TCI state may be configured to contain: $\{\{qcl\text{-}Type1, qcl\text{-}Type2\}_{\lambda=0}, \{qcl\text{-}Type1, qcl\text{-}Type2\}_{\lambda=1}, \{qcl\text{-}Type1, qcl\text{-}Type2\}_{\lambda=2}\}$ for each of the three CDM groups respectively.

Hence, some TCI states have a single source RS pair as in Rel-15 (or single RS if QCL Type D is not applicable), and are used for DPS while some others have two or three source RS pairs and are used for NC-JT scheduling.

In Rel-15, there are at most eight (8) active TCI states that can support DPS of up to 8 different TRPs which should be sufficient for most deployments. With the extended TCI states, there are many more combinations as there is a possibility to select two or three TRPs per TCI state. Hence, it needs to consider whether allowing for even more (extended) TCI states than 8 is beneficial for Rel-16. Note however that the number of simultaneously tracked TRSs or SSBs can remain the same as in Rel-15 and the introduction of extended TCI states should not extend the demands for tracking.

Proposal: Study whether increasing the number of bits in DCI for selecting active TCI states in order to accommodate more transmission hypotheses (without increasing the maximal number of active tracked QCI, source RSs) is beneficial.

iii. Antenna Port Indication Tables

To support multi-TRP transmission with a single PDCCH, the DMRS port transmitted from each TRP must belong to the same CDM group. Hence, the antenna port tables must be able to indicate a flexible number of layers within a CDM group per TRP.

The Rel-15 tables for DMRS Type 1 support scheduling of these layers (L1, L2) in the first and second CDM group respectively:

(L1, L2)=(1,0), (2,0), (0,1), (0,2), (1,1), (2,1), (2,2) for a single DMRS symbol, and (L1, L2)=(1,0), (2,0), (3,0), (4,0), (0,1), (0,2), (0,3), (0,4), (1,1), (2,1), (2,2) for double DMRS symbols.

Here, it can be seen that (1,2) is missing, i.e. the ability to schedule one layer from the first TRP and two layers from the second TRP. Although this can be supported at the cost of one additional extended TCI state code point in DCI where the two pairs of source RSs for the two TRPs are swapped to effectively support both (2,1) and (1,2), however, this configuration based solution, which may be quite common in practice, can be avoided by adding one row in the antenna port indication table. Hence, there is a need for a small update the antenna port table in case of DMRS Type 1.

Proposal: Add one row to the DMRS Type 1 antenna port indication table using ports 0,2,3 to allow for scheduling (1,2) layers in the two CDM groups respectively.

A PDCCH can indicate 1-4 layers flexibly from and contained within any CDM group so DPS with up to rank 4 is supported. DPS for rank 5-8 can also be supported by configuring additional TCI states with a single pair of source RSs for the participating TRPs.

A further optimization of the antenna port indexing could be to also add the (3,1) and (1,3) states to the table, but this is a rather asymmetrical layer distribution and benefits are less obvious, the gains needs to be justified by evaluations.

The Rel-15 tables for DMRS Type 2 support scheduling of these layers (L1, L2, L3) in the first, second and third CDM group (i.e. 1st, 2nd and 3rd TRP) respectively:

(L1, L2, L3)=(1,0,0), (0,1,0), (0,0,1), (2,0,0), (0,2,0), (0,0,2), (1,1,0), (2,1,0), (0,1,2), (2,2,0) for a single DMRS symbol.

(L1, L2, L3)=(1,0,0), (0,1,0) (0,0,1), (2,0,0), (0,2,0), (0,0,2), (3,0,0), (0,3,0), (0,0,3), (4,0,0), (0,4,0), (0,0,4), (1,1,0), (2,1,0), (0,1,2), (2,2,0) for double DMRS symbols.

Here it can be seen that the layer distribution is biased towards the first and second TRP/source QCL and to have more flexibility in selecting sets of TRPs, additional active TCI states must be configured. This can be avoided by adding some more states into the antenna port indexing table, and as there are some reserved states these additional, most probable, transmission hypotheses can be added:

Proposal: Add rows to the DMRS Type 2 antenna port indication tables for PDSCH using:
  a. ports 0,2,4 to allow for scheduling (1,1,1) layers,
  b. ports 0,2 to allow for scheduling (1,1,0) layers,
  c. ports 0,4 to allow for scheduling (1,0,1) layers,
  d. ports 0,2,3 to allow for scheduling (1,2,0) layers.

Category 3: CSI Framework Extensions

In previous meetings, proposals regarding CSI framework extensions for multi-TRP/panel were made by some companies where the NR Rel-15 CSI framework is used as a starting point and consider possible extensions. For example, a gNB may configure a UE with two CSI reporting settings where one report setting may be used for DPS, and the second report setting may be used for NC-JT.

By using Rel-15 framework, the gNB can thus obtain single TRP and NC-JT CSIs in the two CSI reports corresponding to the two CSI reporting settings and then dynamically decide on whether to use DPS or NC-JT for the PDSCH transmission.

For a measurement set with 3 TRPs, this means three single TRP CSIs, each associated with one TRP, and three NC-JT CSIs, each associated with one pairs of TRPs assuming NC-JT over two TRPs. Each of the NC-JT CSI would include a pair of (RI, PMI, CQI) if two CWs are used or a pair of (RI,PMI) and a single CQI if a single CW is used. This kind of CSI feedback has almost 9× feedback overhead comparing to the CSI for single TRP transmission, so there is a strong incentive for overhead reduction enhancements. Therefore, more efficient CSI feedback with low feedback overhead for multi-TRP should be studied.

The Rel-15 CSI feedback framework directly applied to multi-TRP scenario, may incur a large CSI feedback overhead if configured to support dynamic switching between single and multi TRP transmission.

A possible Rel-16 enhancement to the CSI framework is to specify a method where the UE take an even larger active part in the hypothesis selection, similar to the use of CRI for beam selection in the current Rel.15 framework but extended to multi-TRP transmission hypotheses. By letting the UE select a preferred transmission hypothesis (i.e. set of multiple TRPs in this context), the overhead can be reduced since the UE is removing "bad" hypotheses before sending the feedback (i.e. instead of blindly reporting all hypotheses).

Hence it is proposed to investigate further multiple-hypotheses flavour of CSI feedback for multi-TRP/panel transmission in NR with UE side down selection of hypotheses. One example of such feedback is the UE selecting a subset out of the configured number of TRPs for data transmission. For instance, the gNB may configure a UE with N>1 NZP CSI-RS resources in a resource setting for channel measurement where each of the N NZP CSI-RS resources is associated with one TRP. Then, in the corresponding CSI report, the UE can select a subset M, where M<N of NZP CSI-RS resources for channel measurement.

Discussions on CSI enhancements is useful to start as soon as possible so that evaluations can be done, however, agreeing on the details can be slightly down prioritized for the most imminent meetings since there is a need to agree on the details of multi-TRP/panel PDSCH transmission such as number of TRPs/panels supported, extension of TCI framework for multi-TRP/panel, antenna port indication, etc. before there is a possibility to accurately specify a CSI feedback framework to support these agreements.

Proposal: For CSI feedback, study UE assisted multi/single-TRP hypothesis selection feedback where the UE decides on single or multi-TRP transmission based on measurements and indicate the preferred hypothesis to the network.

In Rel-16 NR-MIMO, the details of multi-TRP/panel PDSCH need to be agreed before deciding if CSI framework enhancements are needed and the details.

Category 4: Reliability/Robustness Specific Extensions

The basic principle of increasing the reliability and robustness of a transmitted data packet, from a multi-TRP perspective, is to transmit multiple copies of the same data payload so that the UE can combine then in an "instantaneous retransmission" manner. Each "copy" is then associated with a different active TCI state (assuming PDSCH for the following discussion). The open issue for RAN1 is then how to specify the resources used for each "copy" and how to determine which TCI state to use for which "copy".

In 3GPP Tdoc R1-1900731, an analysis of a few different strategies to achieve multi-TRP diversity benefits is discussed and it is concluded that both repetition in time and in frequency is beneficial for URLLC applications. In 3GPP Tdoc R1-1901116, a study of the effect on the number of TRPs utilized to achieve robustness is discussed and it is shown that even 4 TRPs gives a significant benefit over 2 TRPs also in the case with uneven received power distribution among the 4 (down to 9 dB difference between the best and the worst TRP).

It is then noted that the repetition functionality already exists in Rel-15, using the higher layer parameters pdsch-AggregationFactor where each PDSCH is transmitted with a cycling of predefined RVs with the restriction of a single layer PDSCH. This principle can be extended to also include TCI states. Hence, when UE is configured for such robustness operation, the PDCCH can trigger a set of PDSCH transmissions where each PDSCH may use a different TCI state from the set of activated TCI states in a predefined manner.

Figure 16:
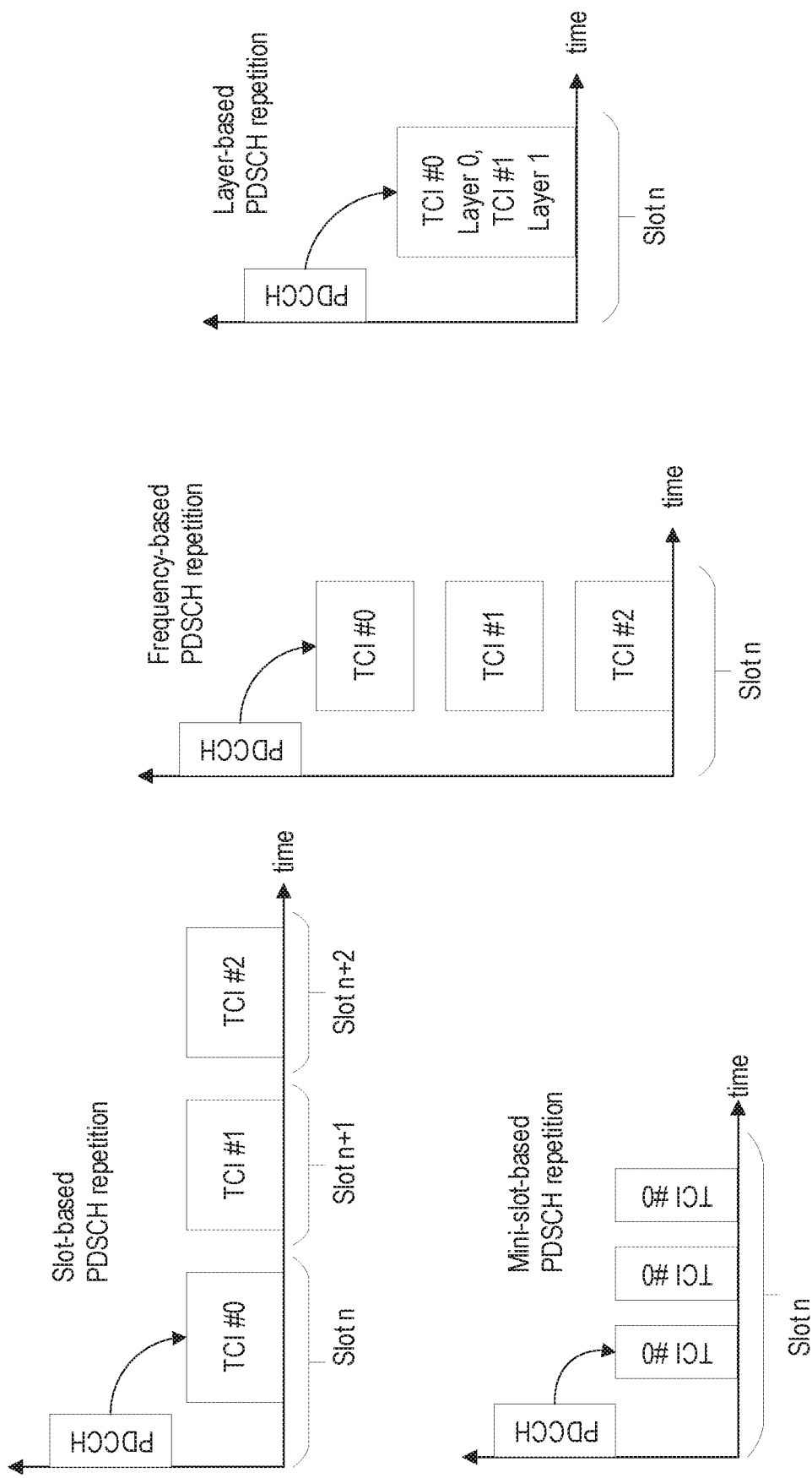
FIG. 16 shows various exemplary arrangements that illustrate slot-, mini-slot, frequency-, and layer-based PDSCH repetition, according to various exemplary embodiments of the present disclosure.

Proposal: One DCI can trigger a repetition of PDSCH transmissions with the same payload where each PDSCH may be configured with a different TCI states from the set of active TCI states In Rel-15, these multiple PDSCHs are transmitted in different slots and with a single layer, but to reduce the latency, in Rel-16 there should be possible to trigger multiple such PDSCHs in the same slot (using type B scheduling, i.e. mini-slot based repetition), in the same set of OFDM symbols by FDM (frequency based repetition), or in overlapping resources (SDM or layer based repetition). How the repetition "pattern" should look alike and how to configure (e.g. by RRC or by RRC+DCI) can be further studied and discussed. FIG. 16 shows various exemplary arrangements that illustrate slot-, mini-slot, frequency-, and layer-based PDSCH repetition.

As in Rel-15, the DCI that triggers the "first" PDSCH contains the necessary information about resource and antenna port allocation, number of layers for a PDSCH etc. and then the same payload is repeated in each of the higher layer configured PDSCH repetition resources, except for RV and TCI states which may change.

Note that the PDSCH repetition options can be combined, for example, with mini-slot based and frequency based simultaneously. Moreover, the Rel-15 single layer restriction per PDSCH can be removed to further give possibility to reduce the latency by increasing the spectral efficiency per PDSCH transmission.

Hence, if the UE support four layer reception, the resources for each PDSCH can be configured to be overlapping (by RRC) and then DCI triggers two PDSCH with two layer each. The same data payload is transmitted in both PDSCH but from different TRPs/TCI states/CDM groups.

RRC configures the resources for repetition as in Rel.15 (slot aggregation), and DCI schedules one PDSCH. It can be further studied what DCI can indicate, for example whether DCI can select between overlapping and non-overlapping resources, the number of repetitions, which TCI states should be utilized per PDSCH etc.

Proposal: Higher layer configures the UE with possible resource location for each repetition of the PDSCH including repetition positions in time (e.g. single or multiple slot or mini-slot based) and in frequency (e.g. non-overlapping or overlapping). FFS if and how DCI can dynamically select among these higher-layer-configured repetition resources and associated TCI states.

For PDCCH robustness, a similar approach as for PDSCH can be taken, where the same DCI is repeated across multiple CORESETs since each CORESET is configured with an individual TCI state. Note that PDCCH repetition and PDSCH repetition as discussed above can be independently configured based on the need. For PDSCH repetition to be enabled, only a single DCI needs to be received and whether this DCI is also repeated by using multiple PDCCH in different CORESET is an independent discussion.

Proposal: The UE can be configured with a search space repetition set across N>1 CORESETs where the same search space is repeated in each CORESET. For a given PDCCH candidate, with a given DCI size, in one search space/CORESET there is a corresponding candidate in each search space in the repetition set of N. All corresponding candidates have the same DCI size and aggregation level.

By this repetition, the UE can perform soft combining of the N PDCCH candidates to improve the DCI detection reliability.

CONCLUSION

The above discussion identified various proposals, which are summarized below:

Proposal 1: Each PDCCH for a UE supporting multi PDCCH reception schedules one PDSCH (at least for eMBB) and the Rel. 16 UE is not expected to be scheduled with
- Partially overlapping PDSCHs in time- and frequency-domain resource allocation.
- More than one PDSCH with DMRS in the same CDM group for overlapping PDSCH resource allocations
- An aggregated number of layers across all PDSCHs in overlapping time-frequency resource that is greater than the maximum number of UE supported/configured layers
- An aggregated number of CW across all PDSCHs in overlapping time-frequency resource that is greater than two Proposal 2: Support mechanisms to extend PDSCH resource mapping around multiple reserved resources from different gNBs, i.e. configured CORESET, ZP-CSI-RS-ResourceSet and lte-CRS-ToMatchAround including dynamic resource mapping around detected PDCCHs Proposal 3: RAN1 concludes that there is no change in CW to layer mapping and number of CW per transmission rank in Rel-16.

Proposal 4: A TCI state can be configured with one, two or three source RS pairs for QCL when UE is configured for DMRS Type 1 and 2 respectively and source RS pair $\lambda$ can be used to derive QCL properties for the DMRS ports of CDM group $\lambda$:
- For DMRS Type 1, a TCI state may be configured to contain: $\{\{qcl\text{-}Type1, qcl\text{-}Type2\}\lambda=0, \{qcl\text{-}Type1, qcl\text{-}Type2\}\lambda=1\}$ for each of the two CDM groups respectively.
- For DMRS Type 2, a TCI state may be configured to contain: $\{\{qcl\text{-}Type1, qcl\text{-}Type2\}\lambda=0, \{qcl\text{-}Type1,qcl\text{-}Type2\}\lambda=1, \{qcl\text{-}Type1,qcl\text{-}Type2\}\lambda=2\}$ for each of the three CDM groups respectively Proposal 5: Study whether increasing the number of bits in DCI for selecting active TCI states in order to accommodate more transmission hypotheses (without increasing the maximal number of active tracked QCL source RSs) is beneficial.

Proposal 6: Add one row to the DMRS Type 1 antenna port indication table using ports 0,2,3 to allow for scheduling (1,2) layers in the two CDM groups respectively.

Proposal 7: Add rows to the DMRS Type 2 antenna port indication tables for PDSCH using:
ports 0,2,4 to allow for scheduling (1,1,1) layers
ports 0,2 to allow for scheduling (1,1,0) layers
ports 0,4 to allow for scheduling (1,0,1) layers
ports 0,2,3 to allow for scheduling (1,2,0) layers Proposal 8: For CSI feedback, study UE assisted multi/single-TRP hypothesis selection feedback where the UE decides on single or multi-TRP transmission based on measurements and indicate the preferred hypothesis to the network Proposal 9: One DCI can trigger a repetition of PDSCH transmissions with the same payload where each PDSCH may be configured with a different TCI states from the set of active TCI states Proposal 10: Higher layer configures the UE with possible resource location for each repetition of the PDSCH including repetition positions in time (e.g. single or multiple slot or mini-slot based) and in frequency (e.g. non-overlapping or overlapping). FFS if and how DCI can dynamically select among these higher-layer-configured repetition resources and associated TCI states.

Proposal 11: The UE can be configured with a search space repetition set across N>1 CORESETs where the same search space is repeated in each CORESET. For a given PDCCH candidate, with a given DCI size, in one search space/CORESET there is a corresponding candidate in each search space in the repetition set of N. All corresponding candidates have the same DCI size and aggregation level.

The embodiments described above can be further illustrated with reference to FIGS. 11-12, which depict exemplary methods (e.g., procedures) performed by UEs and network nodes, respectively. Put differently, various features of the operations described below correspond to various embodiments described above.

Figure 11:
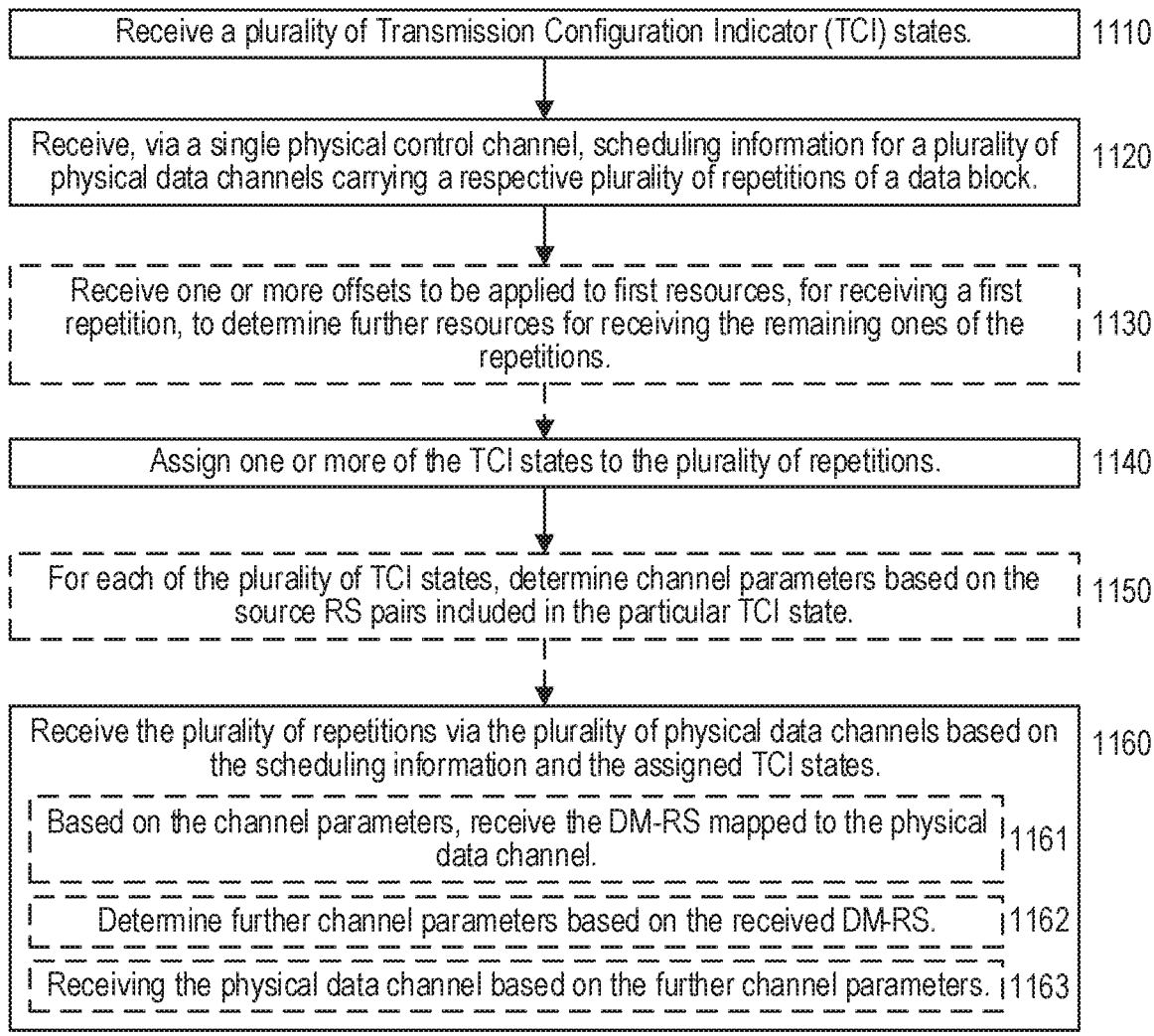
FIG. 11 shows a flow diagrams of an exemplary method (e.g., procedure) performed by a user equipment (UE, e.g., wireless device, IoT device, etc.), according to various exemplary embodiments of the present disclosure.

In particular, FIG. 11 shows a flow diagram of an exemplary method (e.g., procedure) for communicating via a plurality of nodes in a wireless network, according to various exemplary embodiments of the present disclosure. The exemplary method can be performed by a user equipment (UE, e.g., wireless device, IoT device, modem, etc. or component thereof) in communication with one or more network nodes (e.g., base station, gNB, en-gNB, etc., or component thereof) in a wireless network (RAN, e.g., NG-RAN). For example, the exemplary method shown in FIG. 11 can be implemented in a UE configured as described herein with reference to other figures. Furthermore, the exemplary method shown in FIG. 11 can be used cooperatively with other exemplary methods described herein (e.g., FIG. 12) to provide various exemplary benefits described herein. Although FIG. 11 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1110, where the UE can receive, from the wireless network, a plurality of Transmission Configuration Indicator (TCI) states. In some embodiments, the plurality of TCI states can be associated with one of the following: a respective plurality of nodes in the wireless network; or a respective plurality of beams associated with one or more nodes in the wireless network.

The exemplary method can also include the operations of block 1120, where the UE can receive, via a single physical control channel, scheduling information for a plurality of physical data channels carrying a respective plurality of repetitions of a data block. For example, the physical control channel can be a PDCCH and the scheduling information can be a scheduling DCI, such as discussed above. In some embodiments, the plurality of physical data channels can be respective layers of a physical downlink shared channel (PDSCH). In other embodiments, each physical data channel can be a subset of all layers of a PDSCH.

In some embodiments, the scheduling information can also include an indicator of resources for receiving one or more of the repetitions. The indicated resources can be in at least one of the following dimensions: time, frequency, and spatial layer. In some embodiments, the resources for at least two of the repetitions can be in the same set of symbols in a slot.

In other embodiments, the scheduling information can include an indicator of first resources for receiving a first one of the repetitions. In such embodiments, the exemplary method can also include the operations of block 1230, where the UE can receive one or more offsets to be applied to the first resources to determine further resources for receiving the remaining ones of the repetitions. In such embodiments, the further resources can be located in one of the following with respect to the first resources: one or more subsequent slots, or one or more subsequent symbols within the same slot.

In some embodiments, the indicated resources for at least two of the repetitions can overlap completely in frequency. In such embodiments, the scheduling information also includes at least one of the following for each of the completely overlapping repetitions: a unique set of demodulation reference signal (DMRS) ports; DMRS ports from a unique code-division multiplexing (CDM) group; and a unique data scrambling seed.

In some embodiments, the scheduling information can also include an indicator of a mapping between the plurality of repetitions and a plurality of redundancy versions (RV) of the data block.

The exemplary method can also include the operations of block 1140, where the UE can assign one or more of the TCI states to the plurality of repetitions. In some embodiments, the plurality of TCI states is less than the plurality of repetitions, and the plurality of TCI states are assigned to the repetitions in a predefined order. As an illustrative example, each physical data channel (carrying respective repetitions) can be transmitted by a different TRP using one of the activated TCI states (e.g., the TCI states provide to the UE in block 1110) in a pre-defined order. The UE can also be aware of this predefined order, and assign TCI states to repetitions in a corresponding manner.

In other embodiments, the scheduling information can also include an indicator of a mapping between one or more of the TCI states and the plurality of repetitions. In such embodiments, the one or more TCI states are assigned to the repetitions based on the indicated mapping. In some of these embodiments, the indicator is included in a field having a plurality of codepoints, the plurality of TCI states being less than the plurality of codepoints. In such embodiments, a first subset of the codepoints can be associated with individual TCI states and a second subset of the codepoints can be associated with combinations of individual TCI states.

In some embodiments, each TCI state includes one or more source reference signal (RS) pairs, with each source RS pair having a corresponding pair of quasi-colocation (QCL) relations with antenna ports, for DM-RS, that are mapped to a particular physical data channel. For example, the pair of QCL relations can include any of QCL relations Types A-D, discussed above. In such embodiments, the exemplary method can also include the operations of block 1150, where the UE can, for each of the plurality of TCI states, determine channel parameters based on the source RS pairs included in the particular TCI state.

The exemplary method can also include the operations of block 1160, where the UE can receive the plurality of repetitions via the plurality of physical data channels based on the scheduling information and the assigned TCI states. In some embodiments, the operations of block 1160 can include the operations of sub-blocks 1161-1163, for each of the physical data channels. In sub-block 1161, the UE can, based on the channel parameters (e.g., determined for the source RS pairs in block 1150), receive the DM-RS mapped to the physical data channel. In this manner, the UE can utilize the source RS pairs and the QCL relations to receive a target RS, e.g., DM-RS. In sub-block 1162, the UE can determine further channel parameters based on the received DM-RS. In sub-block 1163, the UE can receive the physical data channel based on the further channel parameters.

Figure 12:
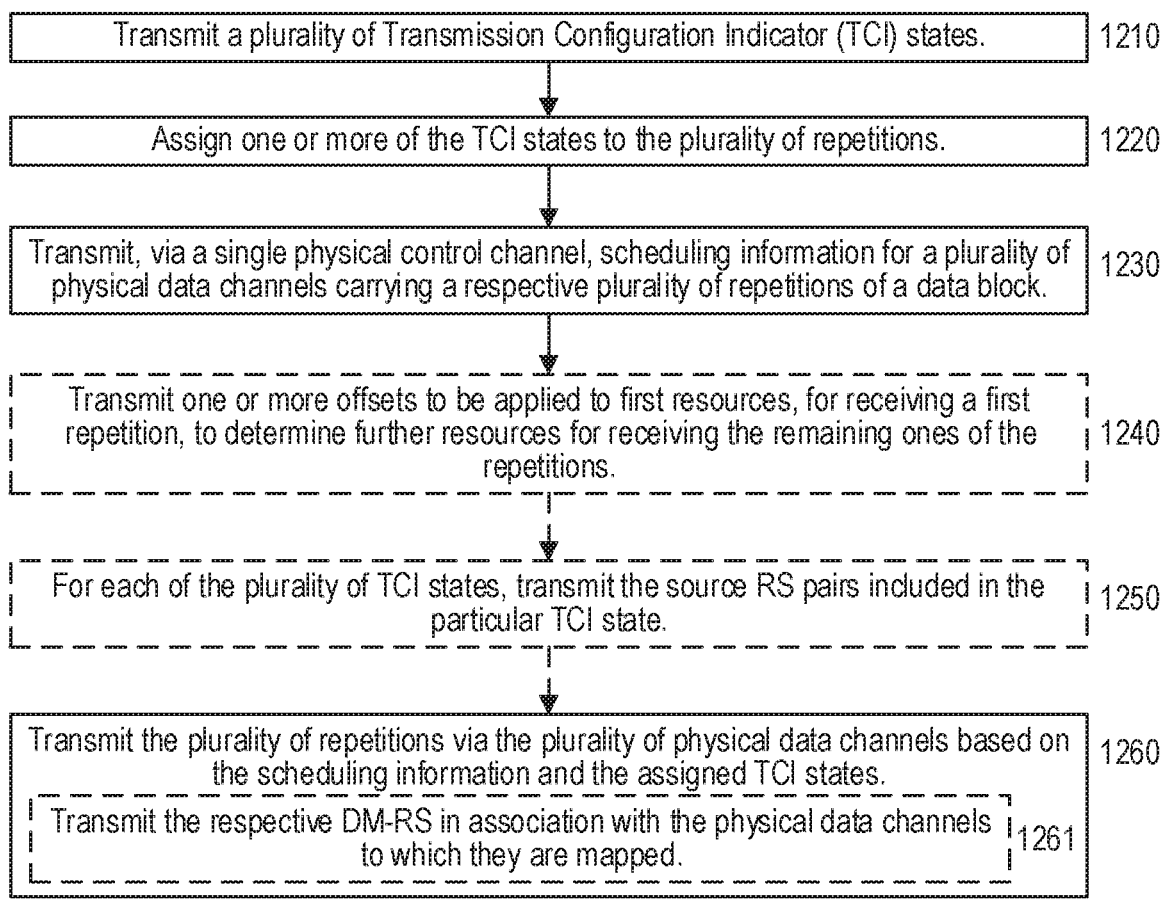
FIG. 12 shows a flow diagram of an exemplary method (e.g., procedure) performed by a wireless network including one or more nodes (e.g., base stations, gNBs, eNBs, en-gNBs, etc.), according to various exemplary embodiments of the present disclosure.

In addition, FIG. 12 shows an exemplary method (e.g., procedure) for communicating via a plurality of physical data channels with a single user equipment (UE), according to various exemplary embodiments of the present disclosure. The exemplary method can be performed by one or more network nodes (e.g., base stations, eNBs, gNBs, en-gNBs, etc., or components thereof) of a wireless network (e.g., NG-RAN, E-UTRAN). For example, the exemplary method shown in FIG. 12 can be implemented in one or more network nodes of a wireless network configured as described herein with reference to other figures. Furthermore, the exemplary method shown in FIG. 12 can be used cooperatively with other exemplary methods described herein (e.g., FIG. 11) to provide various exemplary benefits and/or advantages. Although FIG. 12 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1210, where the wireless network can transmit, to the UE, a plurality of Transmission Configuration Indicator (TCI) states. In some embodiments, the plurality of TCI states can be associated with one of the following: a respective plurality of nodes in the wireless network; or a respective plurality of beams associated with one or more nodes in the wireless network.

The exemplary method can also include the operations of block 1220, where the wireless network can assign one or more of the TCI states to a plurality of repetitions, of a data block, to be carried by a respective plurality of physical data channels. In some embodiments, the plurality of TCI states can be less than the plurality of repetitions, and the plurality of TCI states can be assigned to the repetitions in a pre-defined order. As an illustrative example, each physical data channel (carrying respective repetitions) can be transmitted by a different TRP using one of the activated TCI states (e.g., the TCI states provided to the UE in block 1210) in a pre-defined order. The UE can also be aware of this pre-defined order, and assign TCI states to repetitions in a corresponding manner.

The exemplary method can also include the operations of block 1230, where the wireless network can transmit, via a single physical control channel, scheduling information for a plurality of physical data channels carrying a respective plurality of repetitions of a data block. For example, the physical control channel can be a PDCCH and the scheduling information can be a scheduling DCI, such as discussed above. In some embodiments, the plurality of physical data channels can be respective layers of a physical downlink shared channel (PDSCH). In other embodiments, each physical data channel can be a subset of all layers of a PDSCH.

In some embodiments, the scheduling information can also include an indicator of resources for receiving one or more of the repetitions. The indicated resources can be in at least one of the following dimensions: time, frequency, and spatial layer. In some embodiments, the resources for at least two of the repetitions can be in the same set of symbols in a slot.

In other embodiments, the scheduling information can include an indicator of first resources for receiving a first one of the repetitions. In such embodiments, the exemplary method can also include the operations of block 1240, where the wireless network can transmit one or more offsets to be applied to the first resources to determine further resources for receiving the remaining ones of the repetitions. In such embodiments, the further resources can be located in one of the following with respect to the first resources: one or more subsequent slots, or one or more subsequent symbols within the same slot.

In some embodiments, the indicated resources for at least two of the repetitions can overlap completely in frequency. In such embodiments, the scheduling information can also include at least one of the following for each of the completely overlapping repetitions: a unique set of demodulation reference signal (DMRS) ports; DMRS ports from a unique code-division multiplexing (CDM) group; and a unique data scrambling seed.

In some embodiments, the scheduling information can also include an indicator of a mapping between the plurality of repetitions and a plurality of redundancy versions (RV) of the data block.

In some embodiments, the scheduling information can also include an indicator of a mapping between one or more of the TCI states and the plurality of repetitions. For example, this mapping can reflect and/or indicate the assignment of TCI states to repetitions in block 1220. In some of these embodiments, the indicator is included in a field having a plurality of codepoints, the plurality of TCI states being less than the plurality of codepoints. In such embodiments, a first subset of the codepoints can be associated with individual TCI states and a second subset of the codepoints can be associated with combinations of individual TCI states.

In some embodiments, each TCI state includes one or more source reference signal (RS) pairs, with each source RS pair having a corresponding pair of quasi-colocation (QCL) relations with antenna ports, for DM-RS, that are mapped to a particular physical data channel. For example, the pair of QCL relations can include any of QCL relations Types A-D, discussed above. In such embodiments, the exemplary method can also include the operations of block

1250, where the wireless network can, for each of the plurality of TCI states, transmit the source RS pair included in the particular TCI state.

The exemplary method can also include the operations of block 1260, where the wireless network can transmit the plurality of repetitions via the plurality of physical data channels based on the scheduling information and the assigned TCI states. In some embodiments, the operations of block 1260 can include the operations of sub-block 1261, where the wireless network can transmit the respective DM-RS in association with the physical data channels to which they are mapped. This can facilitate the UE to utilize the source RS pairs and the QCL relations to receive a target RS (e.g., DM-RS) that is associated with a particular physical data channel.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 13:
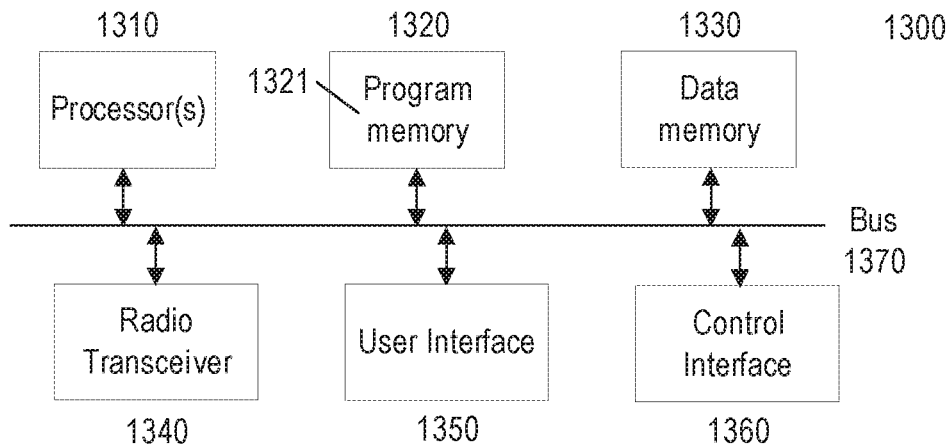
FIG. 13 is a block diagram of an exemplary wireless device or UE according to various exemplary embodiments of the present disclosure.

FIG. 13 shows a block diagram of an exemplary wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the exemplary methods described herein.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or control interface 1360. Program memory 1320 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some exemplary embodiments, the radio transceiver 1340 includes one or more transmitters and one or more receivers that enable UE 1300 to communicate according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some exemplary embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some exemplary embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible devices.

In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1300 having a touch screen display are capable of receiving user inputs, such as inputs related to exemplary methods described herein or otherwise known to persons of ordinary skill.

In some embodiments. UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the UE 1300 can take various forms depending on the particular exemplary embodiment of UE 1300 and of the particular interface requirements of other devices that the UE 1300 is intended to communicate with and/or control. For example, the control interface 1360 can comprise an RS-232 interface, an RS-4135 interface, a USB interface, an HDMI interface, a Bluetooth interface, an IEEE ("Firewire") interface, an I2C interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including any program code corresponding to and/or embodying any exemplary embodiments (e.g., of methods) described herein.

Figure 14:
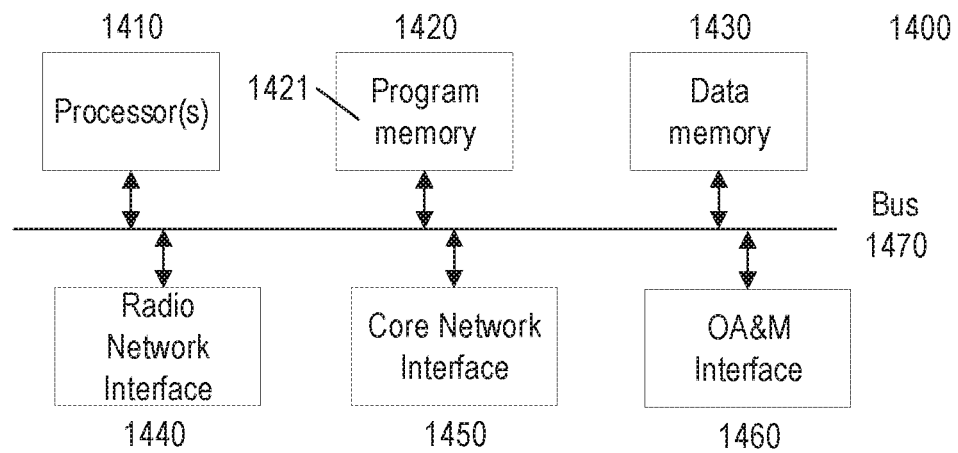
FIG. 14 is a block diagram of an exemplary network node according to various exemplary embodiments of the present disclosure.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods described herein. In some exemplary embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some exemplary embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some exemplary embodiments, core network interface 1450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN (also referred to as a "wireless network"), such as with other eNBs, gNBs, ng-eNBs, en-gNBs, IAB nodes, etc. Such hardware and/or software can be part of radio network interface 1440 and/or core network interface 1450, or it can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
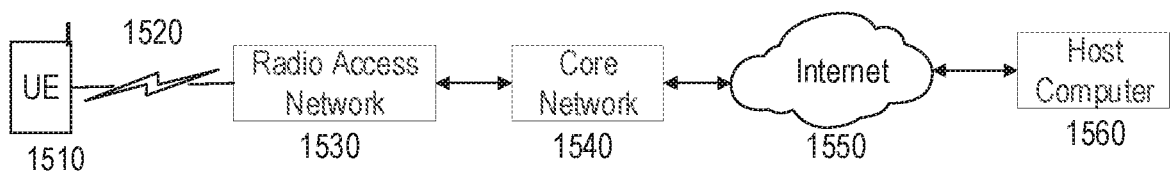
FIG. 15 is a block diagram of an exemplary network configured to provide over-the-top (OTT) data services between a host computer and a UE, according to various exemplary embodiments of the present disclosure.

FIG. 15 is a block diagram of an exemplary communication network configured to provide over-the-top (OTT) data services between a host computer and a user equipment (UE), according to various exemplary embodiments of the present disclosure. UE 1510 can communicate with radio access network (RAN, also referred to as "wireless network") 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface. As another example, gNBs and ng-eNBs comprising an NG-RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530) as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for ultra-reliable, low-latency communication (URLLC) by configuring for UEs—such as UE 1510—to transmit and/or receive multiple versions of a data block on separate physical data channel (e.g., PDSCH or PUSCH). In this manner, PDSCH diversity by multi-TRP transmission to a single UE can be achieved even with using a only single PDCCH to convey the configuration of the multiple transmissions and/or receptions of the data block. This can increase reliability, reduce latency, reduce PDCCH blocking probability, and/or reduce UE complexity. When used in NR UEs (e.g., UE 1510) and gNBs (e.g., gNBs comprising RAN 1530), exemplary embodiments described herein can provide various improvements, benefits, and/or advantages that facilitate the use of data services (e.g., URLLC) having strict performance requirements. As a consequence, this improves the performance of these services as experienced by OTT service providers and end-users, including more consistent data throughout and lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

1. A method for receiving a plurality of channels, such as physical downlink shared channels (PDSCHs), wherein each channel carries a version of the same data payload but is transmitted in a different frequency resource and/or different spatial resource, optionally by a different source, such as a transmission reception point (TRP), in a wireless communication network, optionally, the method comprising one or more of:
   receiving, from the network, such as via a network node, a plurality of indicators, such as Transmission Configuration Indicator (TCI) states, associated with a respective plurality of transmission sources, or an indication of a plurality of indicators;
   for one or more of the plurality of transmission sources, determining channel parameters based on receiving one or more source reference signals (RS) identified by an indicator or via the indication of the plurality of indicators associated with the plurality of transmission sources;
   receiving, via a one or more channels, such as a physical downlink control channel (PDCCH), configuration information for a plurality of PDSCHs; and
   based on the determined channel parameters, receiving the plurality of PDSCHs from the plurality of transmission sources according to the configuration information.

2. The method of embodiment 1, wherein each of the source RS is associated with a different one of the plurality of physical data channels.

3. The method of any of embodiments 1-2, wherein the configuration information identifies resources for receiving at least a portion of the plurality of physical data channels, e.g. PDSCH, and wherein the identified resources are in at least one of the following dimensions: time, frequency, and spatial layer.

4. The method of embodiment 3, wherein the resources for at least two of the physical data channels, e.g. PDSCH are non-overlapping in at least one of the following dimensions: frequency and spatial layer.

5. The method of any of embodiments 3-4, wherein the resources for at least two of the physical data channels, e.g. PDSCH overlap completely in frequency.

6. The method of embodiment 5, wherein the configuration information for the completely overlapping physical data channel, e.g. PDSCH further includes at least one of the following:
   a unique set of demodulation reference signal (DMRS) ports for each overlapping physical data channel, e.g. PDSCH;
   DMRS ports from a different CDM group for each overlapping physical data channel, e.g. PDSCH; and
   a unique data scrambling seed for each overlapping physical data channel, e.g. PDSCH.

7. The method of any of embodiments 3-6, wherein:
   the configuration information identifies resources for receiving a first one of the plurality of physical data channel, e.g. PDSCH; and
   the method further comprises receiving, via higher-layer signaling, an identification of resources for receiving the remaining ones of the plurality of physical data channel, e.g. PDSCH.

8. The method of embodiment 7, further comprising determining the number of physical data channel, e.g. PDSCH comprising the plurality based on the identified resources for receiving the first one of the plurality.

9. The method of any of embodiments 3-8, wherein the identified resources for receiving the plurality of physical data channel, e.g. PDSCH includes time resources that are located within one of the following: a plurality of slots, and a plurality of non-overlapping OFDM symbols within a slot.

10. The method of any of embodiments 1-9, wherein the plurality of physical data channel, e.g. PDSCH carry different redundancy versions (RVs) of a single data block.

11. The method of any of embodiments 1-10, wherein the received configuration information includes information relating at least a portion of the plurality of TCI states to the plurality of PDSCH.

12. The method of embodiment 11, wherein:
   the received configuration information includes information relating a first one of the plurality of TCI states to a first one of the plurality of physical data channels, e.g. PDSCH; and
   the method further comprises selecting, for the other ones of the plurality of physical data channels, e.g. PDSCH, other ones of the plurality of TCI states according to a pre-determined rule.

13. The method of embodiment 12, wherein:
   the information relating the plurality of TCI states to the plurality of physical data channels, e.g. PDSCH, comprises a field with a plurality of codepoints;
   each codepoint associated with one of the TCI states; and
   a subset of the plurality of codepoints is used to relate the first one of the plurality of TCI states to the first one of the plurality of physical data channels, e. g. PDSCH.

14. The method of any of embodiments 11-13, further comprising receiving a control message that activates at least a subset of the plurality of TCI states, wherein the channel parameters are determined only for the activated subset of TCI states.

15. The method of embodiment 14, wherein the received configuration information includes information relating a further subset of the activated subset of TCI states to the plurality of physical data channels, e.g. PDSCH.

16. The method of any of embodiments 1-15, wherein at least two of the physical data channels, e.g. PDSCH, are in the same set of OFDM symbols in a slot.

17. The method of any of embodiments 1-16, wherein the source RS for each physical data channel, e.g. PDSCH, is different.

18. A method for transmitting a plurality of channels, such as physical uplink shared channels (PUSCHs) to a wireless communication network, e.g. to a network node such as user equipment, wherein each channel carries a version of the same data payload but is transmitted in a different frequency resource and/or in a different spatial resource, is optionally transmitted by a different source, such as a transmission reception point (TRP), optionally, the method comprising one or more of:

receiving, from the network, a plurality of resource indicators associated with a respective plurality of transmission resources or an indication of a plurality of resource indicators associated with a respective plurality of transmission resources;

for one or more of the plurality of transmission resources, determining channel parameters based on transmitting one or more source reference signals (RS) identified by the resource indicator associated with the transmission resource;

receiving, e.g. via a single physical downlink control channel, e.g. PDCCH, configuration information for a plurality of physical channels, e.g. PUSCH; and based on the determined channel parameters, transmitting the plurality of physical channels, e.g. PUSCH, using the plurality of transmission resources according to the configuration information.

19. The method of embodiment 18, wherein each of the source RS is associated with a different one of the plurality of physical channels, e.g. PUSCH.

20. The method of any of embodiments 18-19, wherein the configuration information identifies resources for transmitting at least a portion of the plurality of physical channels, e.g. PUSCH, and wherein the identified resources are in at least one of the following dimensions: time, frequency, and spatial layer.

21. The method of embodiment 20, wherein the resources for at least two of the PUSCH are non-overlapping in at least one of the following dimensions: frequency and spatial layer.

22. The method of any of embodiments 20-21, wherein the resources for at least two of the physical channels, e.g. PUSCH, overlap completely in frequency.

23. The method of embodiment 22, wherein the configuration information for the completely overlapping physical channels, e.g. PUSCH, further includes at least one of the following:
 a unique set of demodulation reference signal (DMRS) ports for each overlapping physical channels, e.g. PUSCH;
 DMRS ports from a different CDM group for each overlapping physical channels, e.g. PUSCH; and
 a unique data scrambling seed for each overlapping physical channels, e.g. PUSCH.

24. The method of any of embodiments 20-23, wherein:
the configuration information identifies resources for transmitting a first one of the plurality of physical channels, e.g. PUSCH; and/or
the method further comprises receiving, via higher-layer signaling, an identification of resources for transmitting the remaining ones of the plurality of physical channels, e.g. PUSCH.

25. The method of embodiment 24, further comprising determining the number of physical channels, e.g. PUSCH comprising the plurality based on the identified resources for transmitting the first one of the plurality.

26. The method of any of embodiments 20-25, wherein the identified resources for transmitting the plurality of physical channels, e.g. PUSCH, includes time resources that are located within one of the following: a plurality of slots, and a plurality of non-overlapping OFDM symbols within a slot.

27. The method of any of embodiments 18-26, wherein the plurality of physical channels, e.g. PUSCH, carry different redundancy versions (RVs) of a single data block.

28. The method of any of embodiments 18-27, wherein the received configuration information includes information relating at least a portion of the plurality of resource indicators to the plurality of physical channels, e.g. PUSCH.

29. The method of embodiment 28, wherein:
the received configuration information includes information relating a first one of the plurality of resource indicators to a first one of the plurality of physical channels, e.g. PUSCH; and/or
the method further comprises selecting, for the other ones of the plurality of physical channels, e.g. PUSCH, other ones of the plurality of resource indicators according to a pre-determined rule.

30. The method of embodiment 29, wherein:
the information relating the plurality of resource indicators to the plurality of physical channels, e.g. PUSCH, comprises a field with a plurality of codepoints; and/or
each codepoint associated with one of the resource indicators; and/or
a subset of the plurality of codepoints is used to relate the first one of the plurality of resource indicators to the first one of the plurality of physical channels, e.g. PUSCH.

31. The method of any of embodiments 28-30, further comprising receiving a control message that activates at least a subset of the plurality of resource indicators, optionally wherein the channel parameters are determined only for the activated subset of resource indicators.

32. The method of embodiment 31, wherein the received configuration information includes information relating a further subset of the activated subset of resource indicators to the plurality of PUSCH.

33. The method of any of embodiments 18-32, wherein at least two of the physical channels, e.g. PUSCH, are in the same set of OFDM symbols in a slot.

34. The method of any of embodiments 18-33, wherein the source RS for each physical channels, e.g. PUSCH, is different.

35. A method, e.g. for transmitting a plurality of physical channels, e.g. PDSCHs to a single user equipment (UE), wherein each physical channel carries a version of the same data payload but is transmitted by a different source in a wireless communication network, the method comprising one or more of:
 transmitting, to the UE, a plurality of indicators or an indication of a plurality of indicators, e.g. Transmission Configuration Indicator (TCI) states, associated with a respective plurality of transmission sources;
 for each of the plurality of transmission sources, transmitting one or more source reference signals (RS) identified by the indicator, e.g. TCI state associated with the transmission source;
 transmitting, to the UE, e.g. via a single physical channel, e.g. (PDCCH), configuration information for a plurality of physical data channels, e.g. PDSCH to be transmitted to the UE; and
 transmitting the plurality of physical data channels, e.g. PDSCH from the plurality of transmission sources according to the configuration information.

36. A method, e.g. for receiving a plurality of physical channels, e.g. PUSCHs, from a single user equipment (UE), wherein each physical channel, e.g. PUSCH, carries a version of the same data payload but is transmitted using different resources, the method comprising one or more of:

transmitting, to the UE, an indication of a plurality of resource indicators associated with a respective plurality of transmission resources;

for each of the plurality of transmission resources, determining channel parameters based on receiving one or more source reference signals (RS) identified by the resource indicator associated with the particular transmission resource;

transmitting, to the UE, e.g. via a single physical channel, e.g. PDCCH, configuration information for a plurality of physical data channels, e.g. PUSCH to be transmitted by the UE; and based on the determined channel parameters, receiving the plurality of physical data channels, e.g. PUSCH, using the plurality of transmission resources according to the configuration information.

37. A user equipment (UE), e.g. configured to receive a plurality of physical channels, e.g. PDSCHs, wherein each physical channel, e.g. PDSCH, carries a version of the same data payload but is transmitted by a different source in a wireless communication network, the UE comprising one or more of:

communication circuitry configured to communicate with the wireless communication network; and processing circuitry operatively associated with the communication circuitry and configured to perform operations corresponding to the methods of any of exemplary embodiments 1-17.

38. A user equipment (UE), e.g. configured to transmit a plurality of physical channels, e.g. physical uplink shared channels (PUSCHs), wherein each physical channels, e.g. PUSCH, carries a version of the same data payload but is transmitted using different resources, the UE comprising:

communication circuitry configured to communicate with the wireless communication network; and processing circuitry operatively associated with the communication circuitry and configured to perform operations corresponding to the methods of any of exemplary embodiments 18-34.

39. A radio access network (RAN), e.g. arranged to transmit a plurality of physical channels, e.g. physical downlink shared channels (PDSCH), to a single user equipment (UE), wherein each physical channel, e.g. PDSCH, carries a version of the same data payload but is transmitted by a different source in the RAN, the RAN comprising:

communication circuitry configured to communicate with the UE; and processing circuitry operatively associated with the communication circuitry and configured to perform operations corresponding to the methods of embodiment 35.

40. A radio access network (RAN), e.g. arranged to receive a plurality of physical channels, e.g. physical uplink shared channels (PUSCH), from a single user equipment (UE), wherein each physical channel, e.g. PUSCH, carries a version of the same data payload but is transmitted using different resources, the RAN comprising:

communication circuitry configured to communicate with the UE; and processing circuitry operatively associated with the communication circuitry and configured to perform operations corresponding to the methods of embodiment 36.

41. A non-transitory, computer-readable medium storing computer-executable instructions that, when executed by at least one processor of a user equipment (UE), configure the UE to perform operations corresponding to the methods of any of exemplary embodiments 1-34.

42. A non-transitory, computer-readable medium storing computer-executable instructions that, when executed by at least one processor comprising a radio access network (RAN), configure the RAN to perform operations corresponding to the methods of any of exemplary embodiments 35-36.

In addition, embodiments of the present disclosure include, but are not limited to, the following examples, which are divided into group A ("receive") and group B ("transmit"). Although the following refers to "TCI" and "SRI", these are merely examples and can also be different indicators, as recognized by persons skilled in the art.

Group A

A UE, optionally configured by the network to receive multiple PDSCH (or other similar channels), where, each of the multiple PDSCH is (or comprises) a repetition of the same data payload and where, optionally, the DMRS (or other similar reference signal) for each PDSCH is QCL with a configured source RS or pair of source RSs. One or more of the following features may further apply:

Where at least two of the PDSCH are in the same set of OFDM symbols in a slot.

Where the source RS(s) for each PDSCH is different

Where the configuration is received by a DCI message (or other downlink message)

Where the configuration is received by a RRC message.

Where the configuration contains the resource allocation for each of the multiple PDSCH Where the configuration also includes a repetition in time, over multiple slots and/or over multiple transmissions within a slot in non-overlapping OFDM symbols (covers the mini-slot repetition case)

Where at least two PDSCH are non-overlapping in frequency (FDM)

Where at least two PDSCH are completely overlapping in frequency (spatial repetition)
  In which case each of the overlapping PDSCH is configured a unique set of DMRS port(s) (to maintain orthogonality of DMRS ports)
  In which case each of the overlapping PDSCH is configured DMRS ports from a different CDM group
  In which case each of the overlapping PDSCH is configured by a unique data scrambling seed.

Where each PDSCH is encoded using a different RV.

Where the source RS(s) for each PDSCH is obtained by associating each PDSCH with a TCI state from a set of TCI states
  Where for each PDSCH a different TCI state is selected from the set in a cyclic manner
  Where the TCI state to use for one PDSCH is given by DCI and the TCI to use for the other PDSCH from the set of TCI states, are given by a pre-determined rule
  Where a subset of the codepoint values in the TCI field in DCI are used to indicate the TCI state to use for one PDSCH and the other PDSCH from the set of TCI states are given by a pre-determined rule
  Where each TCI state in the set is an active TCI state, activated by MAC CE.

Where the set of TCI states are configured by higher layer signaling between the network and the UE Where the set of TCI states are configured by higher layer signaling between the network and the UE and where DCI further down-selects which TCI states is used for the transmission Where the frequency resources occupied by each PDSCH are configured by higher layer signaling between the network and the UE
  In which the frequency resources can be configured to be overlapping.
Where the number of PDSCH in the slot is determined by DCI
  Where only the resource allocation for one PDSCH is indicated in DCI and the resource allocation of the remaining PDSCH in the slot are determined and pre-configured by higher layer signaling
  Where the number of for PDSCH(s) is implicit, depending on one or more of the scheduled BW of the PDSCH indicated by DCI, the carrier bandwidth, and the bandwidth of the bandwidth part.
Where the number PDSCH transmissions in a repetition and the associated time and frequency resources, TCI states or TRPs, redundancy versions, and DMRS ports are jointly configured by RRC and dynamically indicated in the DCI Group B A UE, optionally configured by the network to transmit multiple PUSCH (or other similar channels), where, optionally, each of the multiple PUSCH is (or comprises) a repetition of the same data payload and, optionally, where the DMRS (or other reference signal) for each PUSCH have a spatial relation with a source RS. Optionally, one or more of the following features may also apply:
  Where at least two of the PUSCH are in the same set of OFDM symbols in a slot.
  Where the source RS for each PUSCH is different.
  Where the configuration is received by a DCI message (or other downlink message)
  Where the configuration is received by a RRC message.
  Where the configuration contains the resource allocation for each of the multiple PUSCH
  Where the configuration also includes a repetition in time, over multiple slots and/or over multiple transmissions within a slot in non-overlapping OFDM symbols (covers the mini-slot repetition case)
  Where at least two PUSCH are non-overlapping in frequency (FDM)
  Where at least two PUSCH are completely overlapping in frequency (spatial repetition), one or more of the following may apply:
    In which case each of the overlapping PUSCH is configured a unique set of DMRS port(s) (to maintain orthogonality of DMRS ports)
    In which case each of the overlapping PUSCH is configured DMRS ports from a different CDM group
    In which case each of the overlapping PUSCH is configured by a unique data scrambling seed.
  Where each PUSCH is encoded using a different RV.
  Where the source RS for each PUSCH is obtained by associating each PUSCH with a SRI state from a set of SRIs, one or more of the following may apply:
    Where for each PUSCH a different SRI is selected from the set in a cyclic manner
    Where the SRI to use for one PUSCH is given by DCI and the SRI to use for the other PUSCH from the set of SRIs, are given by a pre-determined rule
  Where the set of SRI states are configured by higher layer signaling between the network and the UE.
  Where the set of SRIs are configured by higher layer signaling between the network and the UE and where DCI further down-selects which SRI is used for the transmission Where the frequency resources occupied by each PUSCH are configured by higher layer signaling between the network and the UE
  In which the frequency resources can be configured to be overlapping.
Where the number of PUSCH in the slot is determined by DCI
  Where only the resource allocation for one PUSCH is indicated in DCI and the resource allocation of the remaining PUSCH in the slot are determined and pre-configured by higher layer signaling
  Where the number of for PUSCH(s) is implicit, depending on the scheduled BW of the PUSCH indicated by DCI

The invention claimed is:

1. A method, performed by a user equipment (UE), for communicating via a plurality of nodes in a wireless network, the method comprising:
  receiving a plurality of Transmission Configuration Indicator (TCI) states;
  receiving, via a single physical control channel, scheduling information for a plurality of physical data channels carrying a respective plurality of repetitions of a data block, wherein:
    the scheduling information includes an indicator of a mapping between one or more of the TCI states and the plurality of repetitions;
    the indicator is included in a field having a plurality of codepoints, the plurality of TCI states being less than the plurality of codepoints;
    a first subset of the codepoints are associated with individual TCI states; and
    a second subset of the codepoints are associated with combinations of individual TCI states;
  based on the indicated mapping, assigning one or more of the TCI states to the plurality of repetitions; and
  receiving the plurality of repetitions via the plurality of physical data channels based on the scheduling information and the assigned TCI states.

2. The method of claim 1, wherein:
  the plurality of TCI states is less than the plurality of repetitions; and
  the plurality of TCI states are assigned to the repetitions in a predefined order.

3. The method of claim 1, wherein:
  the scheduling information also includes an indicator of resources for receiving one or more of the repetitions; and
  the indicated resources are in at least one of the following dimensions: time, frequency, and spatial layer.

4. The method of claim 3, wherein the resources for at least two of the repetitions are in the same set of symbols in a slot.

5. The method of claim 3, wherein:
  the scheduling information includes an indicator of first resources for receiving a first one of the repetitions; and
  the method further comprises receiving one or more offsets to be applied to the first resources to determine further resources for receiving the remaining ones of the repetitions.

6. The method of claim 5, wherein the further resources are located in one of the following with respect to the first resources: one or more subsequent slots, or one or more subsequent symbols within the same slot.

7. The method of claim 3, wherein:
  the indicated resources for at least two of the repetitions overlap completely in frequency; and the scheduling information also includes at least one of the following for each of the completely overlapping repetitions:
  a unique set of demodulation reference signal (DM-RS) ports;
  DMRS ports from a unique code-division multiplexing (CDM) group; and
  a unique data scrambling seed.

8. The method of claim 1, wherein the scheduling information also includes an indicator of a mapping between the plurality of repetitions and a plurality of redundancy versions (RV) of the data block.

9. The method of claim 1, wherein:
  each TCI state includes one or more source reference signal (RS) pairs;
  each source RS pair has a corresponding pair of quasi-colocation (QCL) relations with antenna ports, for demodulation reference signals (DM-RS) that are mapped to a particular physical data channel; and
  the method further comprises, for each of the plurality of TCI states, determining channel parameters based on the source RS pairs included in the particular TCI state.

10. The method of claim 9, wherein receiving the plurality of repetitions via the plurality of physical data channels further comprises, for each of the physical data channels:
  based on the channel parameters, receiving the DM-RS mapped to the physical data channel;
  determining further channel parameters based on the received DM-RS; and
  receiving the physical data channel based on the further channel parameters.

11. The method of claim 1, wherein the plurality of TCI states are associated with one of the following:
  a respective plurality of nodes in the wireless network; or
  a respective plurality of beams associated with one or more nodes in the wireless network.

12. The method of claim 1, wherein one of the following applies:
  the plurality of physical data channels are respective layers of a physical downlink shared channel (PDSCH); or
  each physical data channel is a subset of all layers of a PDSCH.

13. A user equipment (UE) configured to communicate via a plurality of nodes in a wireless network, the UE comprising:
  radio transceiver circuitry configured to communicate with the plurality of nodes; and
  processing circuitry operatively coupled to the radio transceiver circuitry, whereby the processing circuitry and the radio transceiver circuitry are configured to perform operations corresponding to the method of claim 1.

14. A method, performed by one or more nodes in a wireless network, for communicating via a plurality of physical data channels with a single user equipment (UE), the method comprising:
  transmitting, to the UE, a plurality of Transmission Configuration Indicator (TCI) states;
  assigning one or more of the TCI states to a plurality of repetitions, of a data block, to be carried by a respective plurality of physical data channels, wherein the assigning is according to a mapping between one or more of the TCI states and the plurality of repetitions;
  transmitting, to the UE via a single physical control channel, scheduling information for the plurality of physical data channels carrying the respective plurality of repetitions, wherein:
    the scheduling information includes an indicator of the mapping;
    the indicator is included in a field having a plurality of codepoints, the plurality of TCI states being less than the plurality of codepoints;
    a first subset of the codepoints are associated with individual TCI states; and
    a second subset of the codepoints are associated with combinations of individual TCI states; and
  transmitting the plurality of repetitions via the plurality of physical data channels based on the scheduling information and the assigned TCI states.

15. The method of claim 14, wherein:
  the plurality of TCI states is less than the plurality of repetitions; and
  the plurality of TCI states are assigned to the repetitions in a predefined order.

16. The method of claim 14, wherein:
  the scheduling information also includes an indicator of resources for transmitting or receiving one or more of the repetitions; and
  the indicated resources are in at least one of the following dimensions: time, frequency, and spatial layer.

17. The method of claim 16, wherein the resources for at least two of the repetitions are in the same set of symbols in a slot.

18. The method of claim 16, wherein:
  the scheduling information includes an indicator of first resources for receiving a first one of the repetitions; and
  the method further comprises transmitting one or more offsets to be applied to the first resources to determine further resources for receiving the remaining ones of the repetitions.

19. The method of claim 18, wherein the further resources are located in one of the following with respect to the first resources: one or more subsequent slots, or one or more subsequent symbols within the same slot.

20. The method of claim 16, wherein:
  the indicated resources for at least two of the repetitions overlap completely in frequency; and
  the scheduling information also includes at least one of the following for each of the completely overlapping repetitions:
    a unique set of demodulation reference signal (DM-RS) ports;
    DMRS ports from a unique code-division multiplexing (CDM) group; and
    a unique data scrambling seed.

21. The method of claim 14, wherein the scheduling information also includes an indicator of a mapping between the plurality of repetitions and a plurality of redundancy versions (RV) of the data block.

22. The method of claim 14, wherein:
  each TCI state includes one or more source reference signal, RS, pairs;
  each source RS pair has a corresponding pair of quasi-colocation (QCL) relations with antenna ports, for demodulation reference signals (DM-RS) that are mapped to a particular physical data channel;
  the method further comprises, for each of the plurality of TCI states, transmitting the source RS pairs included in the particular TCI state; and transmitting the plurality of repetitions via the plurality of physical data channels further comprises transmitting the respective DM-RS in association with the physical data channels to which they are mapped.

23. The method of claim 14, wherein the plurality of TCI states are associated with one of the following:
   a respective plurality of nodes in the wireless network; or
   a respective plurality of beams associated with one or more nodes in the wireless network.

24. The method of claim 14, wherein one of the following applies:
   the plurality of physical data channels are respective layers of a physical downlink shared channel (PDSCH); or
   each physical data channel is a subset of all layers of a PDSCH.

25. A wireless network comprising one or more nodes, the wireless network being configured to communicate via a plurality of physical shared channels with a single user equipment (UE), the one or more nodes comprising:
   radio network interface circuitry configured to communicate with the UE; and
   processing circuitry operatively coupled to the radio network interface circuitry, whereby the processing circuitry and the radio network interface circuitry are configured to perform operations corresponding to the method of claim 14.

* * * * *